(12) United States Patent
Liao

(10) Patent No.: US 9,158,093 B2
(45) Date of Patent: Oct. 13, 2015

(54) IMAGING LENS, AND ELECTRONIC APPARATUS INCLUDING THE SAME

(71) Applicant: Genius Electronic Optical Co., Ltd., Taichung (TW)

(72) Inventor: Chen-Cheng Liao, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/261,979

(22) Filed: Apr. 25, 2014

(65) Prior Publication Data

US 2015/0116573 A1     Apr. 30, 2015

(30) Foreign Application Priority Data

Oct. 31, 2013  (TW) .............................. 102139540 A

(51) Int. Cl.

| | | |
|---|---|---|
| *G02B 3/02* | (2006.01) | |
| *G02B 13/18* | (2006.01) | |
| *G02B 9/62* | (2006.01) | |
| *G02B 13/00* | (2006.01) | |
| *H04N 5/225* | (2006.01) | |
| *G02B 13/04* | (2006.01) | |
| *G02B 3/04* | (2006.01) | |
| *G02B 5/00* | (2006.01) | |

(52) U.S. Cl.
CPC .......... *G02B 13/0045* (2013.01); *H04N 5/2252* (2013.01); *H04N 5/2254* (2013.01); *G02B 3/04* (2013.01); *G02B 5/005* (2013.01); *G02B 9/62* (2013.01); *G02B 13/002* (2013.01); *G02B 13/0015* (2013.01); *G02B 13/04* (2013.01); *G02B 13/18* (2013.01)

(58) Field of Classification Search
CPC ...... G02B 13/0045; G02B 9/62; G02B 13/18; G02B 13/04; G02B 13/0015; G02B 3/04; G02B 5/005; G02B 13/002
USPC .................. 359/713, 740, 749, 752, 756, 761
See application file for complete search history.

(56) References Cited

U.S. PATENT DOCUMENTS

| | | |
|---|---|---|
| 7,907,352 B2 | 3/2011 | Miyano |
| 8,040,618 B2 | 10/2011 | Kitahara |
| 8,164,834 B2 | 4/2012 | Miyano |
| 8,248,715 B2 | 8/2012 | Asami et al. |
| 8,320,048 B2 | 11/2012 | Yamamoto |
| 8,355,215 B2 | 1/2013 | Asami |
| 8,432,619 B2 | 4/2013 | Huang |
| 8,456,763 B2 | 6/2013 | Hsieh et al. |

(Continued)

FOREIGN PATENT DOCUMENTS

| | | |
|---|---|---|
| JP | 2011053507 A | 3/2011 |
| TW | I268381 | 9/1994 |

(Continued)

OTHER PUBLICATIONS

Search report appended to office action of related Taiwanese application No. 102139540 issued Aug. 4, 2014 along with English translation.

*Primary Examiner* — Evelyn A Lester

(57) ABSTRACT

An imaging lens includes first to sixth lens elements arranged from an object side to an image side in the given order. Through designs of surfaces of the lens elements and relevant optical parameters, a short system length of the imaging lens may be achieved while maintaining good optical performance.

16 Claims, 36 Drawing Sheets

(56) References Cited

U.S. PATENT DOCUMENTS

2006/0115261 A1 6/2006 Nomura
2014/0118844 A1* 5/2014 Tsai et al. .................... 359/713

FOREIGN PATENT DOCUMENTS

| TW | I325064 B | 9/2008 |
|---|---|---|
| TW | I330718 B | 11/2008 |
| TW | M354744 U | 4/2009 |
| TW | M355391 U | 4/2009 |
| TW | 201011337 A | 3/2010 |
| TW | M391105 U1 | 10/2010 |
| TW | 201038968 A | 11/2010 |
| TW | M398126 U1 | 2/2011 |
| TW | 201245757 A | 11/2012 |
| TW | 201337320 A | 9/2013 |

* cited by examiner

| system focal length =1.46mm, half field-of-view =60.0°, F-number =2.60, system length =12.31mm | | | | | | | |
|---|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 30.031 | 0.700 | 1.729157 | 54.680 | Glass | -4.253 |
| | image-side surface 32 | 2.792 | 1.556 | | | | |
| second lens element 4 | object-side surface 41 | 29.113 | 2.135 | 1.637 | 23.231 | plastic | 650.330 |
| | image-side surface 42 | 30.396 | 0.660 | | | | |
| third lens element 5 | object-side surface 51 | 4.087 | 2.122 | 1.532 | 56.064 | plastic | 6.076 |
| | image-side surface 52 | -12.910 | 0.316 | | | | |
| aperture stop 2 | | ∞ | 0.318 | | | | |
| fourth lens element 6 | object-side surface 61 | 4.132 | 0.339 | 1.637 | 23.231 | plastic | -5.940 |
| | image-side surface 62 | 1.920 | 0.060 | | | | |
| fifth lens element 7 | object-side surface 71 | 3.031 | 1.939 | 1.545 | 55.930 | plastic | 1.468 |
| | image-side surface 72 | -0.845 | 0.030 | | | | |
| sixth lens element 8 | object-side surface 81 | 1.399 | 0.300 | 1.637 | 23.231 | plastic | -2.538 |
| | image-side surface 82 | 0.690 | 0.500 | | | | |
| optical filter 9 | object-side surface 91 | ∞ | 0.210 | | | | |
| | image-side surface 92 | ∞ | 1.120 | | | | |
| image plane 100 | | ∞ | 0.000 | | | | |

FIG.3

| surface | 41 | 42 | 51 | 52 | 61 |
|---|---|---|---|---|---|
| K | 5.359E+01 | -1.998E+04 | 6.087E-01 | 4.761E+01 | 3.047E+01 |
| a4 | 4.523E-03 | -5.287E-03 | -6.892E-03 | -7.034E-03 | -3.916E-01 |
| a6 | -3.773E-04 | 2.511E-04 | 4.151E-03 | 3.920E-02 | -7.381E-03 |
| a8 | -6.179E-06 | 1.735E-04 | 1.261E-03 | -9.601E-03 | -1.602E-01 |
| a10 | | | | | |
| a12 | | | | | |
| surface | 62 | 71 | 72 | 81 | 82 |
| K | -1.939E+01 | 4.845E+00 | -2.786E+00 | -1.507E+01 | -4.634E+00 |
| a4 | -7.469E-02 | -2.243E-02 | 2.672E-03 | -1.064E-01 | -1.724E-01 |
| a6 | -2.449E-01 | -2.654E-02 | -9.590E-02 | -3.467E-02 | 9.014E-02 |
| a8 | 2.425E-01 | 9.034E-02 | 1.161E-01 | 6.188E-02 | -2.787E-02 |
| a10 | | -4.951E-02 | -1.531E-02 | -3.046E-02 | 3.621E-03 |
| a12 | | | -2.806E-02 | 5.947E-03 | 8.024E-05 |
| a14 | | | 1.308E-02 | -6.404E-04 | -7.716E-05 |

| system focal length =1.42mm, half field-of-view =60.0°, F-number =2.62, system length =10.63mm | | | | | | | |
|---|---|---|---|---|---|---|---|
| lens element | surface | | radius of curvature | thickness | refractive index | Abbe number | material | focal length |
| object | | ∞ | ∞ | | | | |
| first lens element 3 | object-side surface 31 | 19.806 | 0.500 | 1.729 | 54.680 | Glass | -5.047 |
| | image-side surface 32 | 3.079 | 2.141 | | | | |
| second lens element 4 | object-side surface 41 | 12.291 | 0.519 | 1.585 | 29.909 | plastic | -51.372 |
| | image-side surface 42 | 8.604 | 2.307 | | | | |
| third lens element 5 | object-side surface 51 | 2.562 | 0.905 | 1.545 | 55.930 | plastic | 4.058 |
| | image-side surface 52 | -14.488 | 0.415 | | | | |
| aperture stop 2 | | ∞ | 0.470 | | | | |
| fourth lens element 6 | object-side surface 61 | 4.474 | 0.299 | 1.643 | 22.437 | plastic | -4.698 |
| | image-side surface 62 | 1.764 | 0.060 | | | | |
| fifth lens element 7 | object-side surface 71 | 3.136 | 1.159 | 1.545 | 55.930 | plastic | 1.338 |
| | image-side surface 72 | -0.829 | 0.067 | | | | |
| sixth lens element 8 | object-side surface 81 | 1.374 | 0.288 | 1.643 | 22.437 | plastic | -2.124 |
| | image-side surface 82 | 0.631 | 0.500 | | | | |
| optical filter 9 | object-side surface 91 | ∞ | 0.210 | | | | |
| | image-side surface 92 | ∞ | 0.790 | | | | |
| image plane 100 | | ∞ | 0.000 | | | | |

| surface | 41 | 42 | 51 | 52 | 61 |
|---|---|---|---|---|---|
| K | -6.971E+00 | -1.996E+01 | -9.503E-01 | 1.366E+02 | 3.194E+01 |
| a4 | 2.688E-03 | -5.285E-03 | -1.628E-02 | -2.329E-02 | -3.936E-01 |
| a6 | -3.631E-04 | 7.881E-05 | 2.211E-03 | 6.564E-02 | 9.337E-02 |
| a8 | 1.027E-05 | 1.215E-05 | 3.463E-03 | -4.562E-02 | -7.441E-02 |
| a10 | | | 6.057E-04 | 1.571E-02 | -5.515E-03 |
| a12 | | | | | |
| surface | 62 | 71 | 72 | 81 | 82 |
| K | -1.795E+01 | 5.173E+00 | -2.544E+00 | -1.575E+01 | -4.217E+00 |
| a4 | -5.018E-02 | -2.006E-02 | 1.773E-02 | -1.737E-01 | -1.783E-01 |
| a6 | -2.187E-01 | -2.452E-02 | -9.673E-02 | -3.863E-02 | 8.700E-02 |
| a8 | 2.115E-01 | 9.681E-02 | 1.280E-01 | 6.140E-02 | -3.009E-02 |
| a10 | -4.052E-03 | -4.462E-02 | -6.506E-03 | -3.082E-02 | 4.097E-03 |
| a12 | | -7.353E-04 | -2.348E-02 | 3.870E-03 | 1.622E-04 |
| a14 | | | 1.424E-02 | -3.353E-03 | -1.326E-04 |

FIG.8 system focal length =1.45mm, half field-of-view =60.0°, F-number =2.60, system length =10.80mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 28.735 | 0.700 | 1.729 | 54.680 | Glass | -4.797 |
| | image-side surface 32 | 3.086 | 0.991 | | | | |
| second lens element 4 | object-side surface 41 | 43.564 | 2.273 | 1.637 | 23.231 | plastic | 70.160 |
| | image-side surface 42 | 1602.821 | 1.798 | | | | |
| third lens element 5 | object-side surface 51 | 4.259 | 0.621 | 1.532 | 56.064 | plastic | 5.720 |
| | image-side surface 52 | -10.120 | 0.100 | | | | |
| aperture stop 2 | | ∞ | 0.313 | | | | |
| fourth lens element 6 | object-side surface 61 | 4.396 | 0.446 | 1.637 | 23.231 | plastic | -6.113 |
| | image-side surface 62 | 1.985 | 0.060 | | | | |
| fifth lens element 7 | object-side surface 71 | 3.252 | 1.248 | 1.545 | 55.930 | plastic | 1.476 |
| | image-side surface 72 | -0.924 | 0.030 | | | | |
| sixth lens element 8 | object-side surface 81 | 8.321 | 0.820 | 1.637 | 23.231 | plastic | -2.489 |
| | image-side surface 82 | 1.282 | 0.500 | | | | |
| optical filter 9 | object-side surface 91 | ∞ | 0.210 | | | | |
| | image-side surface 92 | ∞ | 0.692 | | | | |
| image plane 100 | | ∞ | 0.000 | | | | |

FIG.11

| surface | 41 | 42 | 51 | 52 | 61 |
|---|---|---|---|---|---|
| K | 1.123E+02 | 6.921E+05 | -1.817E+01 | 2.338E+02 | 3.202E+01 |
| a4 | 9.351E-03 | 5.699E-03 | -6.313E-03 | -4.552E-02 | -4.093E-01 |
| a6 | -7.773E-04 | -9.129E-04 | 9.612E-03 | -1.230E-01 | -6.685E-02 |
| a8 | 7.143E-05 | 2.541E-04 | 2.512E-02 | 6.299E-01 | 9.373E-02 |
| a10 | | | | | |
| a12 | | | | | |
| surface | 62 | 71 | 72 | 81 | 82 |
| K | -1.737E+01 | 4.590E+00 | -1.944E+00 | -2.469E+01 | -5.906E+00 |
| a4 | -1.390E-01 | -3.433E-02 | 1.781E-02 | -1.032E-01 | -8.401E-02 |
| a6 | -1.490E-01 | -4.710E-02 | -7.577E-02 | -2.995E-02 | 4.483E-02 |
| a8 | 1.503E-01 | 9.229E-02 | 1.166E-01 | 3.963E-02 | -2.022E-02 |
| a10 | | -3.600E-02 | -2.128E-02 | -3.625E-02 | 4.669E-03 |
| a12 | | | -3.323E-02 | 8.593E-03 | 3.245E-05 |
| a14 | | | 1.443E-02 | -8.377E-04 | -1.511E-04 |

FIG.12 system focal length =1.45mm, half field-of-view =60.0°, F-number =2.62, system length =10.77mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 19.794 | 0.700 | 1.729 | 54.680 | Glass | -4.774 |
| | image-side surface 32 | 2.916 | 1.313 | | | | |
| second lens element 4 | object-side surface 41 | 27.022 | 1.529 | 1.637 | 23.231 | plastic | 49.900 |
| | image-side surface 42 | 175.596 | 2.318 | | | | |
| third lens element 5 | object-side surface 51 | 4.266 | 0.380 | 1.532 | 56.064 | plastic | 5.692 |
| | image-side surface 52 | -10.135 | 0.100 | | | | |
| aperture stop 2 | | ∞ | 0.354 | | | | |
| fourth lens element 6 | object-side surface 61 | 4.476 | 0.452 | 1.637 | 23.231 | plastic | -5.957 |
| | image-side surface 62 | 1.974 | 0.060 | | | | |
| fifth lens element 7 | object-side surface 71 | 3.250 | 1.288 | 1.545 | 55.930 | plastic | 1.484 |
| | image-side surface 72 | -0.926 | 0.030 | | | | |
| sixth lens element 8 | object-side surface 81 | 9.460 | 0.824 | 1.637 | 23.231 | plastic | -2.421 |
| | image-side surface 82 | 1.282 | 0.500 | | | | |
| optical filter 9 | object-side surface 91 | ∞ | 0.210 | | | | |
| | image-side surface 92 | ∞ | 0.717 | | | | |
| image plane 100 | | ∞ | 0.000 | | | | |

FIG.15

| surface | 41 | 42 | 51 | 52 | 61 |
|---|---|---|---|---|---|
| K | 8.025E+01 | -4.392E+05 | -2.207E+01 | 2.338E+02 | 3.116E+01 |
| a4 | 8.854E-03 | 6.501E-03 | -8.019E-03 | -4.688E-02 | -4.087E-01 |
| a6 | -7.612E-04 | -9.640E-04 | 1.446E-02 | -1.244E-01 | -6.832E-02 |
| a8 | 7.806E-05 | 2.110E-04 | 4.530E-02 | 6.172E-01 | 8.562E-02 |
| a10 | | | | | |
| a12 | | | | | |
| surface | 62 | 71 | 72 | 81 | 82 |
| K | -1.754E+01 | 4.674E+00 | -1.946E+00 | -1.691E+01 | -5.425E+00 |
| a4 | -1.398E-01 | -3.356E-02 | 1.791E-02 | -1.016E-01 | -8.221E-02 |
| a6 | -1.507E-01 | -4.605E-02 | -7.614E-02 | -2.938E-02 | 4.493E-02 |
| a8 | 1.502E-01 | 9.280E-02 | 1.162E-01 | 3.986E-02 | -2.015E-02 |
| a10 | | -3.613E-02 | -2.152E-02 | -3.621E-02 | 4.680E-03 |
| a12 | | | -3.327E-02 | 8.576E-03 | 2.272E-05 |
| a14 | | | 1.442E-02 | | -1.611E-04 |

| system focal length =1.46mm, half field-of-view =60.0°, F-number =2.62, system length =10.86mm | | | | | | | |
|---|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 703.037 | 0.850 | 1.729 | 54.680 | Glass | -4.097 |
| | image-side surface 32 | 2.973 | 1.543 | | | | |
| second lens element 4 | object-side surface 41 | 10.360 | 0.969 | 1.585 | 29.909 | plastic | 31.690 |
| | image-side surface 42 | 22.647 | 2.736 | | | | |
| third lens element 5 | object-side surface 51 | 1.673 | 1.088 | 1.545 | 55.930 | plastic | 4.343 |
| | image-side surface 52 | 4.398 | 0.100 | | | | |
| aperture stop 2 | | ∞ | 0.363 | | | | |
| fourth lens element 6 | object-side surface 61 | 4.432 | 0.271 | 1.585 | 29.909 | plastic | -5.195 |
| | image-side surface 62 | 1.763 | 0.060 | | | | |
| fifth lens element 7 | object-side surface 71 | 3.098 | 0.995 | 1.545 | 55.930 | plastic | 1.353 |
| | image-side surface 72 | -0.858 | 0.030 | | | | |
| sixth lens element 8 | object-side surface 81 | 1.403 | 0.305 | 1.585 | 29.909 | plastic | -2.203 |
| | image-side surface 82 | 0.618 | 0.660 | | | | |
| optical filter 9 | object-side surface 91 | ∞ | 0.210 | | | | |
| | image-side surface 92 | ∞ | 0.675 | | | | |
| image plane 100 | | ∞ | 0.000 | | | | |

| surface | 41 | 42 | 51 | 52 | 61 |
|---|---|---|---|---|---|
| K | 9.311E+00 | -8.468E+00 | -4.719E-01 | 0.000E+00 | 2.890E+01 |
| a4 | 5.418E-03 | -3.222E-03 | -7.062E-03 | 1.997E-02 | -4.221E-01 |
| a6 | -3.370E-04 | 8.734E-05 | 2.551E-02 | -9.083E-03 | 4.580E-02 |
| a8 | 2.216E-05 | -1.385E-05 | -2.931E-02 | -3.835E-02 | 1.884E-01 |
| a10 | | | 1.677E-02 | 4.985E-01 | -6.416E-01 |
| a12 | | | | | |

| surface | 62 | 71 | 72 | 81 | 82 |
|---|---|---|---|---|---|
| K | -1.879E+01 | 6.406E+00 | -3.126E+00 | -1.287E+01 | -3.925E+00 |
| a4 | -9.186E-02 | -2.093E-02 | -1.904E-02 | -2.217E-01 | -1.906E-01 |
| a6 | -2.102E-01 | -2.131E-02 | -1.390E-01 | -7.038E-02 | 8.406E-02 |
| a8 | 2.888E-01 | 9.134E-02 | 1.731E-01 | 4.445E-02 | -2.338E-02 |
| a10 | -2.134E-01 | -4.522E-02 | 4.203E-02 | 3.714E-03 | 3.545E-03 |
| a12 | | -5.694E-03 | -1.493E-02 | 2.829E-02 | 2.972E-04 |
| a14 | | | -8.389E-03 | -2.617E-02 | -3.281E-04 |

FIG.20

| system focal length =1.45mm , half field-of-view =62.0°, F-number =2.60, system length =10.81mm | | | | | | |
|---|---|---|---|---|---|---|
| lens element | surface | radius of curvature | thickness | refractive index | Abbe number | material | focal length |
| object | | ∞ | ∞ | | | | |
| | | ∞ | 0.8 | | | | |
| first lens element 3 | object-side surface 31 | 18.78833 | 0.8 | 1.729157 | 54.680013 | Glass | -4.935 |
| | image-side surface 32 | 2.965708 | 1.648 | | | | |
| second lens element 4 | object-side surface 41 | 24.35581 | 0.864 | 1.63746 | 23.23102 | plastic | 33.128 |
| | image-side surface 42 | -156.6558 | 2.66 | | | | |
| third lens element 5 | object-side surface 51 | 4.329024 | 0.562 | 1.532402 | 56.064489 | plastic | 5.807 |
| | image-side surface 52 | -10.33077 | 0.1 | | | | |
| aperture stop 2 | | ∞ | 0.273 | | | | |
| fourth lens element 6 | object-side surface 61 | 4.611496 | 0.62 | 1.63746 | 23.23102 | plastic | -5.845 |
| | image-side surface 62 | 1.953059 | 0.06 | | | | |
| fifth lens element 7 | object-side surface 71 | 3.419684 | 0.99 | 1.544919 | 55.929938 | plastic | 1.449 |
| | image-side surface 72 | -0.9218327 | 0.03 | | | | |
| sixth lens element 8 | object-side surface 81 | 7.340625 | 0.795 | 1.63746 | 23.23102 | plastic | -2.485 |
| | image-side surface 82 | 1.247947 | 0.5 | | | | |
| optical filter 9 | object-side surface 91 | ∞ | 0.21 | BK7 | | | |
| | image-side surface 92 | ∞ | 0.695 | | | | |
| image plane 100 | | ∞ | 0 | | | | |

FIG.23

| surface | 41 | 42 | 51 | 52 | 61 |
|---|---|---|---|---|---|
| K | 7.001E+01 | -2.202E+05 | -1.990E+01 | 2.397E+02 | 3.386E+01 |
| a4 | 1.212E-02 | 8.891E-03 | -6.252E-03 | -6.162E-02 | -3.879E-01 |
| a6 | -1.034E-03 | -8.100E-04 | 2.681E-03 | -1.052E-01 | -5.758E-03 |
| a8 | 1.305E-04 | 1.298E-04 | 2.628E-02 | 5.720E-01 | -5.454E-02 |
| a10 | | | | | |
| a12 | | | | | |
| surface | 62 | 71 | 72 | 81 | 82 |
| K | -1.765E+01 | 4.280E+00 | -1.987E+00 | -3.000E+01 | -6.333E+00 |
| a4 | -1.395E-01 | -3.048E-02 | 4.047E-02 | -1.086E-01 | -8.108E-02 |
| a6 | -1.504E-01 | -3.967E-02 | -6.042E-02 | -4.206E-02 | 4.212E-02 |
| a8 | 1.096E-01 | 1.032E-01 | 1.245E-01 | 2.389E-02 | -2.021E-02 |
| a10 | | -3.682E-02 | -2.059E-02 | -4.466E-02 | 4.783E-03 |
| a12 | | | -3.611E-02 | 4.203E-03 | 1.699E-05 |
| a14 | | | 1.260E-02 | -2.108E-03 | -1.433E-04 |

FIG.24

| system focal length =1.45mm, half field-of-view =62.0°, F-number =2.60, system length =10.78mm | | | | | | |
|---|---|---|---|---|---|---|
| lens element | surface | radius of curvature | thickness | refractive index | Abbe number | material | focal length |
| object | | ∞ | ∞ | | | | |
| | | ∞ | 0.700 | | | | |
| first lens element 3 | object-side surface 31 | 140.571 | 1.442 | 1.729 | 54.680 | Glass | -3.926 |
| | image-side surface 32 | 2.800 | | | | | |
| second lens element 4 | object-side surface 41 | 22.351 | 2.413 | 1.637 | 23.231 | plastic | 77.653 |
| | image-side surface 42 | 39.039 | 0.761 | | | | |
| third lens element 5 | object-side surface 51 | 12.080 | 0.800 | 1.532 | 56.064 | plastic | 11.306 |
| | image-side surface 52 | -11.721 | 0.099 | | | | |
| aperture stop 2 | | ∞ | 0.100 | | | | |
| fourth lens element 6 | object-side surface 61 | 4.633 | 0.728 | 1.637 | 23.231 | plastic | -7.109 |
| | image-side surface 62 | 2.151 | 0.060 | | | | |
| fifth lens element 7 | object-side surface 71 | 2.793 | 1.000 | 1.545 | 55.930 | plastic | 1.411 |
| | image-side surface 72 | -0.927 | 0.030 | | | | |
| sixth lens element 8 | object-side surface 81 | 3.325 | 0.345 | 1.637 | 23.231 | plastic | -3.329 |
| | image-side surface 82 | 1.243 | 0.500 | | | | |
| optical filter 9 | object-side surface 91 | ∞ | 0.210 | | | | |
| | image-side surface 92 | ∞ | 1.592 | | | | |
| image plane 100 | | ∞ | 0.000 | | | | |

FIG.27

| surface | 41 | 42 | 51 | 52 | 61 |
|---|---|---|---|---|---|
| K | 5.271E+01 | 5.208E+02 | -3.217E+02 | 2.716E+02 | 4.455E+01 |
| a4 | 1.488E-02 | 8.967E-03 | -2.828E-02 | -1.144E-01 | -3.997E-01 |
| a6 | -6.118E-04 | -5.594E-03 | 3.151E-02 | 5.474E-02 | 2.666E-01 |
| a8 | 4.163E-05 | 5.931E-04 | 1.120E-02 | 8.609E-01 | 5.752E-02 |
| a10 | | | | -5.792E-01 | -6.453E-01 |
| a12 | | | | | |

| surface | 62 | 71 | 72 | 81 | 82 |
|---|---|---|---|---|---|
| K | -1.853E+01 | 4.180E+00 | -2.918E+00 | -3.000E+01 | -9.010E+00 |
| a4 | -8.733E-02 | -4.679E-02 | 1.043E-02 | -8.872E-02 | -7.708E-02 |
| a6 | -9.222E-02 | -5.178E-02 | -9.602E-02 | -2.215E-02 | 8.423E-02 |
| a8 | 1.628E-01 | 1.039E-01 | 1.123E-01 | 4.609E-02 | -1.696E-02 |
| a10 | -3.704E-02 | -2.909E-02 | -1.459E-02 | -2.711E-02 | -3.840E-04 |
| a12 | | -1.258E-02 | -2.766E-02 | 3.719E-03 | -7.120E-04 |
| a14 | | | 1.193E-02 | -7.984E-03 | -1.109E-03 |

FIG.28

| system focal length =1.43mm , half field-of-view =62.0°, F-number =2.62, system length =10.70mm | | | | | | | |
|---|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 900.000 | 1.000 | 1.729 | 54.680 | Glass | -4.769 |
| | image-side surface 32 | 3.462 | 1.900 | | | | |
| second lens element 4 | object-side surface 41 | 13.775 | 0.500 | 1.585 | 29.909 | plastic | -34.294 |
| | image-side surface 42 | 8.060 | 1.559 | | | | |
| third lens element 5 | object-side surface 51 | 2.329 | 1.650 | 1.545 | 55.930 | plastic | 4.076 |
| | image-side surface 52 | -35.946 | 0.355 | | | | |
| aperture stop 2 | | ∞ | 0.428 | | | | |
| fourth lens element 6 | object-side surface 61 | 4.421 | 0.200 | 1.643 | 22.437 | plastic | -4.789 |
| | image-side surface 62 | 1.783 | 0.060 | | | | |
| fifth lens element 7 | object-side surface 71 | 3.103 | 1.262 | 1.545 | 55.930 | plastic | 1.333 |
| | image-side surface 72 | -0.812 | 0.010 | | | | |
| sixth lens element 8 | object-side surface 81 | 1.437 | 0.389 | 1.643 | 22.437 | plastic | -2.209 |
| | image-side surface 82 | 0.639 | 0.480 | | | | |
| optical filter 9 | object-side surface 91 | ∞ | 0.210 | | | | |
| | image-side surface 92 | ∞ | 0.695 | | | | |
| image plane 100 | | ∞ | 0.000 | | | | |

FIG.31

| surface | 41 | 42 | 51 | 52 | 61 |
|---|---|---|---|---|---|
| K | -1.685E+00 | -3.917E+01 | -7.961E-01 | -2.068E+03 | 3.297E+01 |
| a4 | 3.267E-03 | -6.182E-03 | -1.185E-02 | -1.271E-02 | -4.095E-01 |
| a6 | -3.787E-04 | 9.102E-05 | -3.982E-04 | 6.102E-02 | 5.231E-02 |
| a8 | 7.341E-07 | 2.897E-05 | 2.355E-03 | -2.312E-02 | -1.529E-01 |
| a10 | | | 1.477E-04 | 3.410E-03 | -8.072E-02 |
| a12 | | | | | |
| surface | 62 | 71 | 72 | 81 | 82 |
| K | -1.808E+01 | 5.293E+00 | -2.321E+00 | -1.231E+01 | -3.897E+00 |
| a4 | -6.677E-02 | -2.458E-02 | -7.753E-03 | -1.291E-01 | -1.395E-01 |
| a6 | -2.237E-01 | -3.185E-02 | -1.054E-01 | -2.437E-02 | 8.117E-02 |
| a8 | 2.107E-01 | 9.331E-02 | 1.254E-01 | 5.724E-02 | -2.962E-02 |
| a10 | -3.635E-02 | -4.465E-02 | -5.419E-03 | -3.003E-02 | 4.628E-03 |
| a12 | | -2.656E-04 | -2.325E-02 | 6.852E-03 | 2.640E-04 |
| a14 | | | 1.453E-02 | -1.844E-03 | -1.796E-04 |

FIG.32

| relationship | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| ALT/T2 | 3.53 | 7.07 | 2.69 | 3.38 | 4.62 | 5.36 | 2.48 | 10.00 |
| Gaa/T6 | 9.80 | 18.96 | 4.01 | 5.07 | 15.84 | 6.00 | 7.22 | 11.08 |
| G23/T3 | 0.31 | 2.55 | 2.90 | 6.10 | 2.51 | 4.73 | 0.95 | 0.94 |
| Gaa/T4 | 8.67 | 18.26 | 7.38 | 9.24 | 17.83 | 7.70 | 3.42 | 21.56 |
| G23/T4 | 1.95 | 7.72 | 4.03 | 5.13 | 10.10 | 4.29 | 1.05 | 7.80 |
| Gaa/T3 | 1.39 | 6.03 | 5.30 | 10.99 | 4.44 | 8.49 | 3.12 | 2.61 |
| EFL/G34 | 2.30 | 1.60 | 3.51 | 3.19 | 3.14 | 3.89 | 7.31 | 1.83 |
| G23/G34 | 1.04 | 2.61 | 4.35 | 5.11 | 5.91 | 7.13 | 3.82 | 1.99 |
| ALT/G12 | 4.84 | 1.71 | 6.16 | 3.94 | 2.90 | 2.81 | 4.15 | 2.63 |
| ALT/G23 | 11.42 | 1.59 | 3.40 | 2.23 | 1.64 | 1.74 | 7.87 | 3.21 |
| T6/T2 | 0.14 | 0.55 | 0.36 | 0.54 | 0.31 | 0.92 | 0.14 | 0.78 |
| EFL/T4 | 4.29 | 4.74 | 3.25 | 3.20 | 5.37 | 2.34 | 2.00 | 7.16 |
| G23/T6 | 2.20 | 8.01 | 2.19 | 2.81 | 8.97 | 3.35 | 2.21 | 4.01 |
| ALT/EFL | 5.18 | 2.59 | 4.22 | 3.57 | 3.08 | 3.19 | 4.12 | 3.49 |
| T5/T4 | 5.72 | 3.88 | 2.80 | 2.85 | 3.67 | 1.60 | 1.37 | 6.31 |

IMAGING LENS, AND ELECTRONIC APPARATUS INCLUDING THE SAME

CROSS-REFERENCE TO RELATED APPLICATION

This application claims priority to Taiwanese Application No. 102139540, filed on Oct. 31, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. Pat. No. 7,580,205 discloses a conventional imaging lens that includes six lens elements, and that has a system length of 2 cm. Such a big imaging lens is unsuitable for use in an electronic device that focuses on slim size and that has a thickness of 1~2 cm.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element, a fourth lens element, a fifth lens elements and a sixth lens element arranged in order from an object side to an image side along an optical axis of the imaging lens. Each of the first lens element, the second lens element, the third lens element, the fourth lens element, the fifth lens element and the sixth lens element has a refractive power, an object-side surface facing toward the object side, and an image-side surface facing toward the image side.

The object-side surface of the first lens element has a convex portion in a vicinity of the optical axis, and the image-side surface of the first lens element has a concave portion in a vicinity of the optical axis.

The object-side surface of the second lens element has a convex portion in a vicinity of the optical axis.

The object-side surface of the third lens element has a convex portion in a vicinity of the optical axis.

The object-side surface of the fifth lens element has a convex portion in a vicinity of a periphery of the fifth lens element, and the image-side surface of the fifth lens element has a convex portion in a vicinity of the optical axis.

The image-side surface of the sixth lens element has a concave portion in a vicinity of the optical axis, and the sixth lens element is made of a plastic material.

The imaging lens does not include any lens element with refractive power other than the first lens element, the second lens element, the third lens element, the fourth lens element, the fifth lens element and the sixth lens element.

Another object of the present invention is to provide an electronic apparatus having an imaging lens with six lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 31 shows values of some optical parameters corresponding to the imaging lens of the eighth preferred embodiment;

FIG. 32 shows values of some parameters of an optical relationship corresponding to the imaging lens of the eighth preferred embodiment;

FIG. 34 is a table that lists values of parameters of other optical relationships corresponding to the imaging lenses of the first to eighth preferred embodiments;

DETAILED DESCRIPTION OF THE PREFERRED EMBODIMENTS

Figure 1:
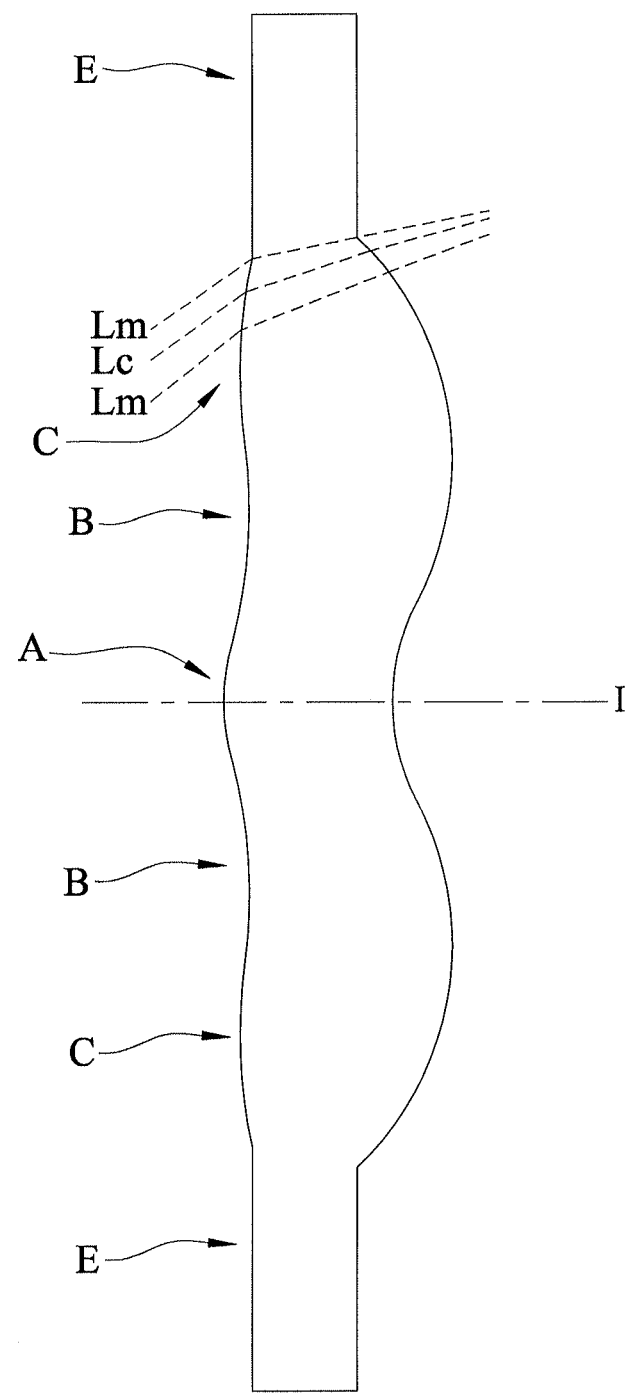
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
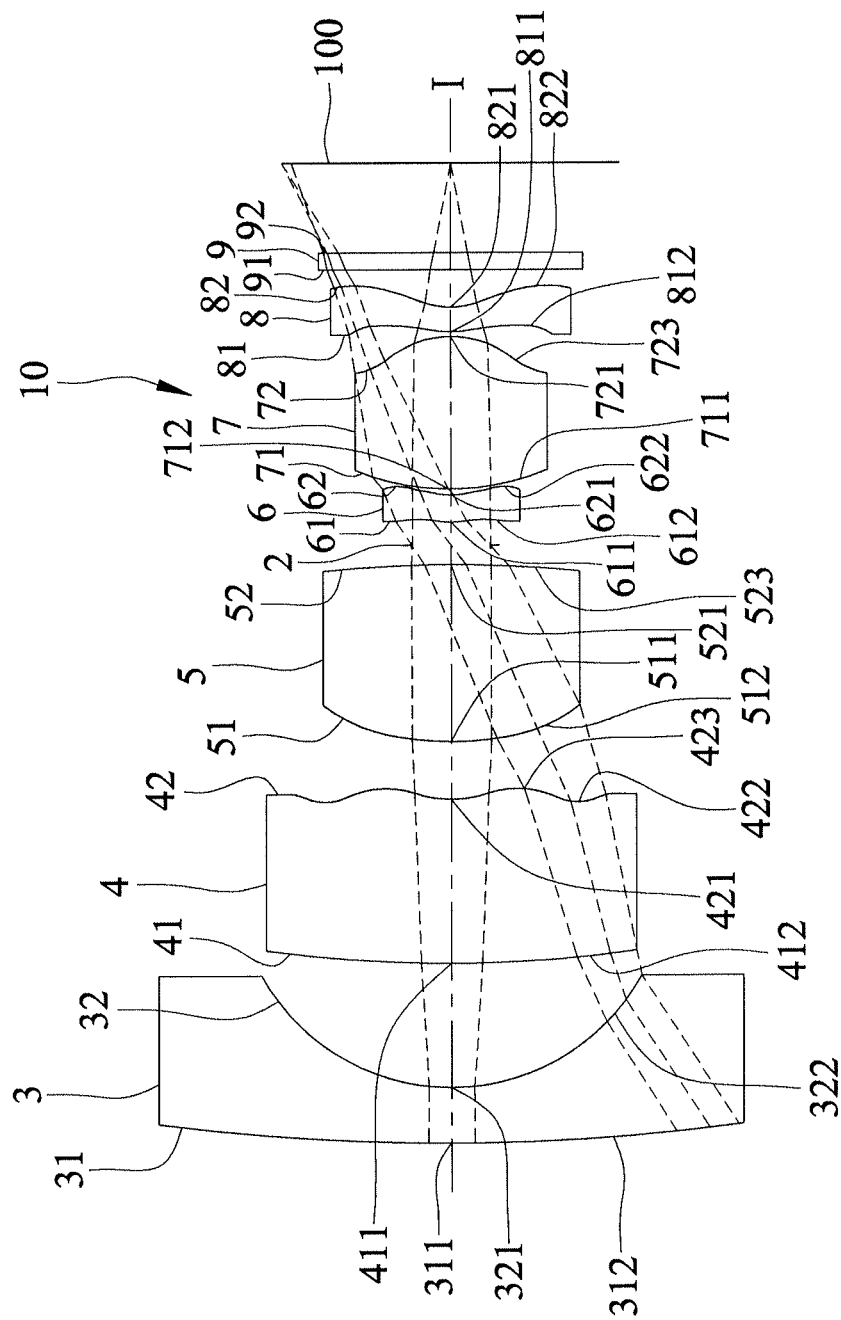
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, a second lens element 4, a third lens element 5, an aperture stop 2, a fourth lens element 6, a fifth lens element 7, a sixth lens element 8 and an optical filter 9 arranged in the given order along an optical axis (I) from an object side to an image side. The optical filter 9 is an infrared cut filter for selectively absorbing infrared light to thereby reduce imperfection of images formed at an image plane 100.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 10 travels through the surfaces 31, 32, 41, 42, 51, 52, 61, 62, 71, 72, 81, 82, 91, 92 in the given order to form an image on the image plane 100.

The lens elements 4-8 are made of a plastic material in this embodiment, and at least one of the lens elements 4-7 may be made of other materials in other embodiments. In addition, each of the lens elements 3-8 has a refractive power.

In the first preferred embodiment, which is depicted in FIG. 2, the first lens element 3 has a negative refractive power and is made of a glass material. The object-side surface 31 of the first lens element 3 is a convex and spherical surface that has a convex portion 311 in a vicinity of the optical axis (I), and a convex portion 312 in a vicinity of a periphery of the first lens element 3. The image-side surface 32 of the first lens element 3 is a concave and spherical surface that has a concave portion 321 in a vicinity of the optical axis (I), and a concave portion 322 in a vicinity of a periphery of the first lens element 3.

The second lens element 4 has a positive refractive power. The object-side surface 41 of the second lens element 4 is a convex and aspherical surface that has a convex portion 411 in a vicinity of the optical axis (I), and a convex portion 412 in a vicinity of a periphery of the second lens element 4. The image-side surface 42 of the second lens element 4 is an aspherical surface that has a concave portion 421 in a vicinity of the optical axis (I), a concave portion 422 in a vicinity of a periphery of the second lens element 4, and a convex portion 423 between the concave portions 421 and 422.

The third lens element 5 has a positive refractive power. The object-side surface 51 of the third lens element 5 is a convex and aspherical surface that has a convex portion 511 in a vicinity of the optical axis (I), and a convex portion 512 in a vicinity of a periphery of the third lens element 5. The image-side surface 52 of the third lens element 5 is a convex and aspherical surface that has a convex portion 521 in a vicinity of the optical axis (I), and a convex portion 523 in a vicinity of a periphery of the third lens element 5.

The fourth lens element 6 has a negative refractive power. The object-side surface 61 of the fourth lens element 6 is an aspherical surface that has a convex portion 611 in a vicinity of the optical axis (I), and a concave portion 612 in a vicinity of a periphery of the fourth lens element 6. The image-side surface 62 of the fourth lens element 6 is an aspherical surface that has a concave portion 621 in a vicinity of the optical axis (I), and a convex portion 622 in a vicinity of the periphery of the fourth lens element 6.

The fifth lens element 7 has a positive refractive power. The object-side surface 71 of the fifth lens element 7 is a convex and aspherical surface that has a convex portion 711 in a vicinity of a periphery of the fifth lens element 7, and a convex portion 712 in a vicinity of the optical axis (I). The image-side surface 72 of the fifth lens element 7 is a convex and aspherical surface that has a convex portion 721 in a vicinity of the optical axis (I), and a convex portion 723 in a vicinity of a periphery of the fifth lens element 7.

The sixth lens element 8 has a negative refractive power. The object-side surface 81 of the sixth lens element 8 is an aspherical surface that has a convex portion 811 in a vicinity of the optical axis (I), and a concave portion 812 in a vicinity of a periphery of the sixth lens element 8. The image-side surface 82 of the sixth lens element 8 is an aspherical surface that has a concave portion 821 in a vicinity of the optical axis (I), and a convex portion 822 in a vicinity of the periphery of the sixth lens element 8.

In the first preferred embodiment, the imaging lens 10 does not include any lens element with refractive power other than the aforesaid lens elements 3-8.

Shown in FIG. 3 is a table that lists values of some optical parameters corresponding to the surfaces 31-91, 32-92 of the first preferred embodiment. The imaging lens 10 has an overall system effective focal length (EFL) of 1.46 mm, a half field-of-view (HFOV) of 60.0°, an F-number of 2.60, and a system length of 12.31 mm. The system length refers to a distance between the object-side surface 31 of the first lens element 3 and the image plane 100 at the optical axis (I).

In this embodiment, each of the object-side surfaces 41-81 and the image-side surfaces 42-82 is aspherical, and satisfies the optical relationship of $$Z(Y) = \frac{Y^2}{R} \Bigg/ \left(1 + \sqrt{1-(1+K)\frac{Y^2}{R^2}}\right) + \sum_{i=1}^{n} a_{2i} \times Y^{2i} \tag{1}$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are listed in FIG. 34, and it should be noted that the values of the relationships listed in FIG. 34 are rounded off to the second decimal place, where:

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

T6 represents a thickness of the sixth lens element 8 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

Gaa represents a sum of air gap lengths between the first lens element 3 and the sixth lens element 8 at the optical axis (I); and ALT represents a sum of the thicknesses of the lens elements 3-8 at the optical axis (I).

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 450 nm, 555 nm, and 650 nm are shown.

It can be understood from FIG. 5(a) that, since each of the curves corresponding to longitudinal spherical aberration has a focal length at each field of view (indicated by the vertical axis) that falls within the range of ±0.03 mm, the first preferred embodiment is able to achieve a relatively low spherical aberration at each of the wavelengths. Furthermore, since the curves at each field of view are close to each other, the first preferred embodiment has a relatively low chromatic aberration.

Figure 5:
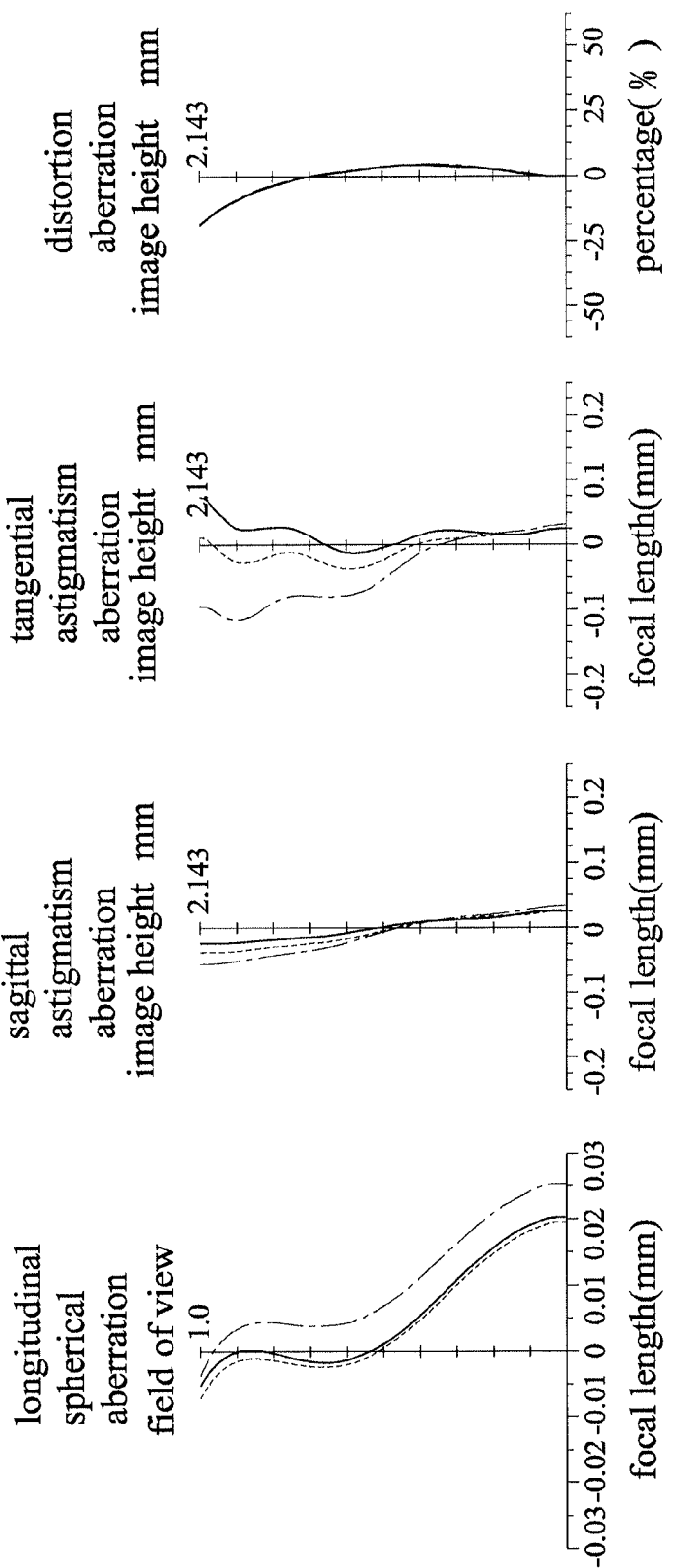
FIGS. 5(a) to 5(d) show different optical characteristics of the imaging lens of the first preferred embodiment.

It can be understood from FIGS. 5 (b) and 5(c) that, since each of the curves falls within the range of ±0.15 mm of focal length, the first preferred embodiment has a relatively low optical aberration.

Moreover, as shown in FIG. 5 (d), since each of the curves corresponding to distortion aberration falls within the range of ±25%, the first preferred embodiment is able to meet requirements in imaging quality of most optical systems.

In view of the above, even with the system length reduced down to 12.31 mm, the imaging lens 10 of the first preferred embodiment is still able to achieve a relatively good optical performance.

Figure 6:
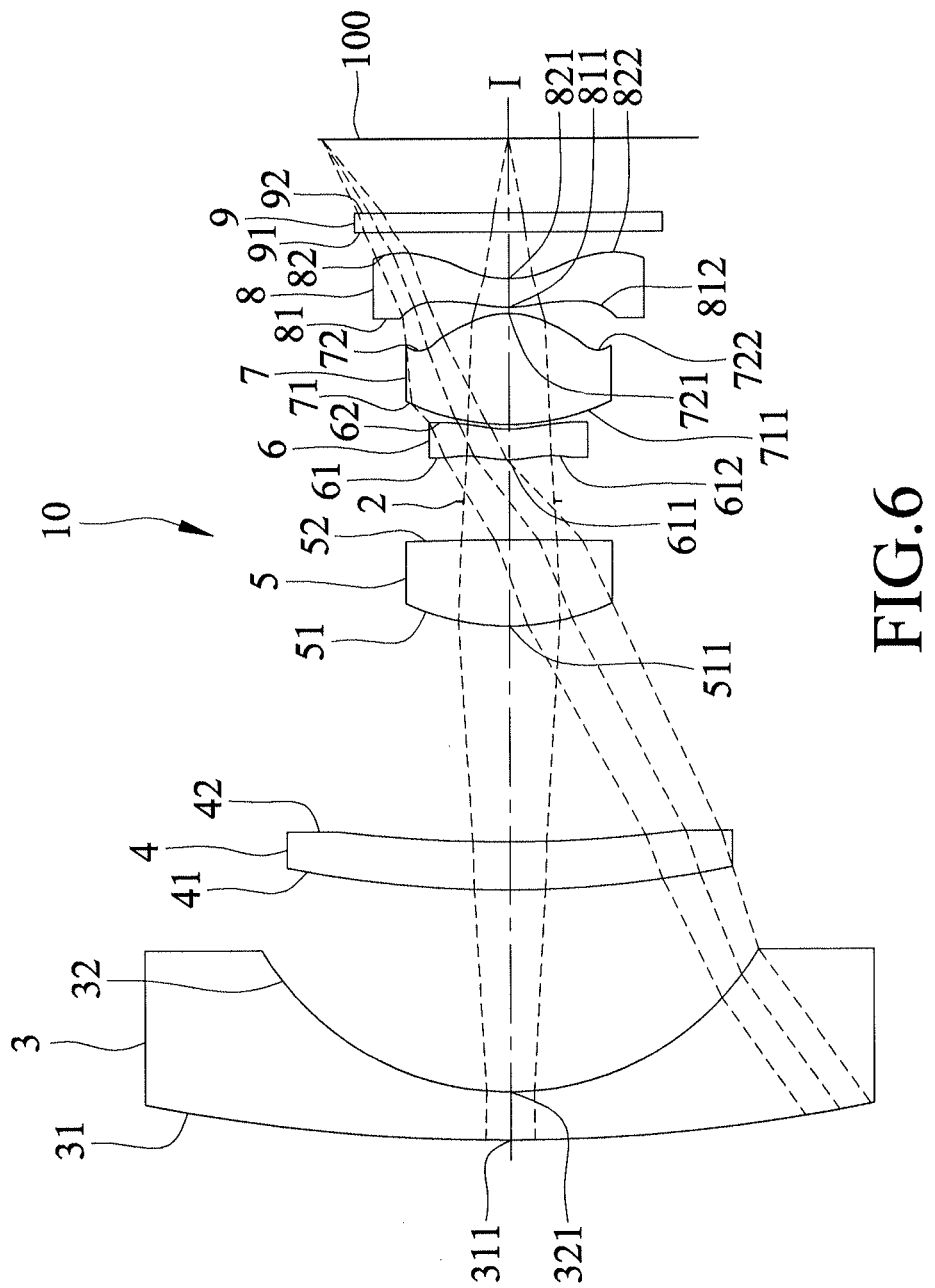
FIG. 6 is a schematic diagram that illustrates the second preferred embodiment of an imaging lens according to the present invention.
Figure 9:
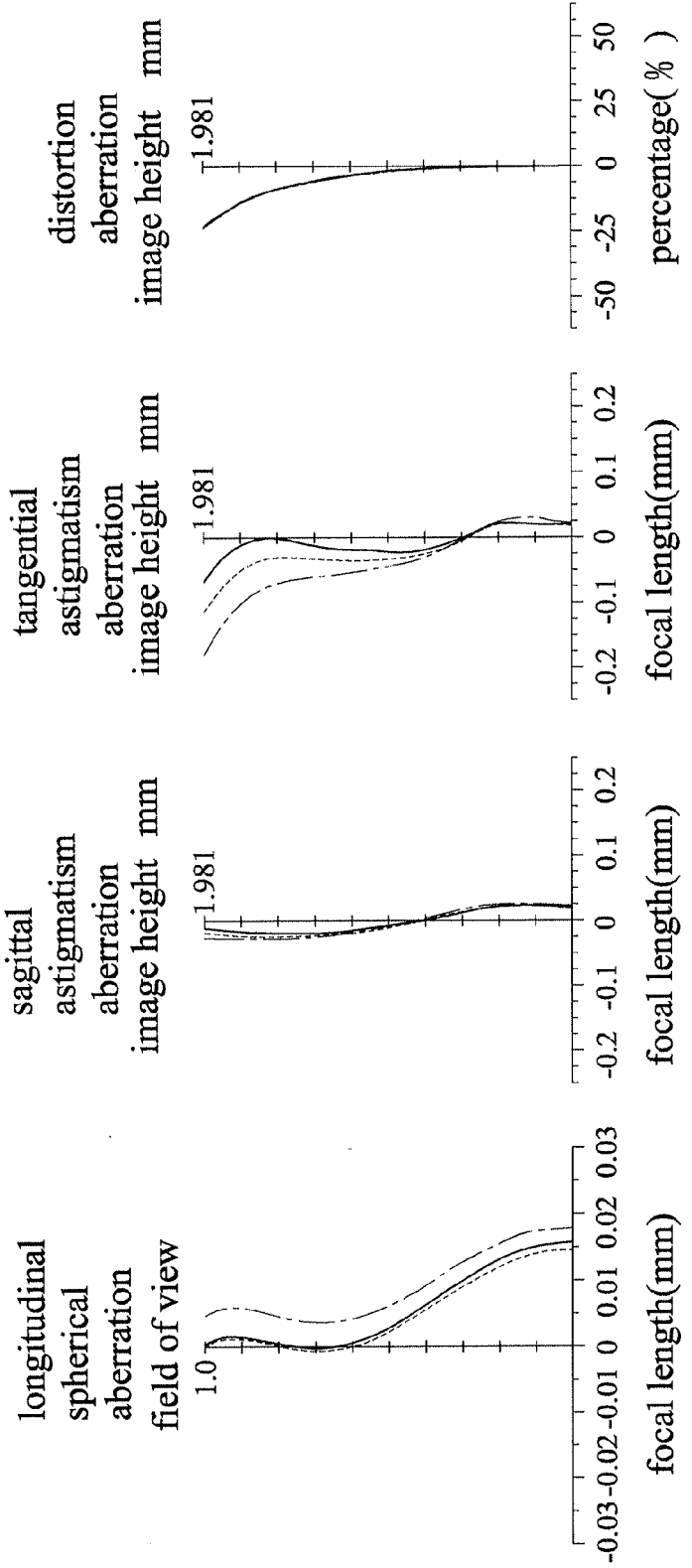
FIGS. 9(a) to 9(d) show different optical characteristics of the imaging lens of the second preferred embodiment.

Referring to FIG. 6, the differences between the first and second preferred embodiments of the imaging lens 10 of this invention reside in that: the second lens element 4 has a negative refractive power; the image-side surface 42 of the second lens element 4 is a concave and aspherical surface; the image-side surface 62 of the fourth lens element 6 is a concave and aspherical surface; and the image-side surface 72 of the fifth lens element 7 has a convex portion 721 in a vicinity of the optical axis (I), and a concave portion 722 in a vicinity of a periphery of the fifth lens element 7.

Shown in FIG. 7 is a table that lists values of some optical parameters corresponding to the surfaces 31-91, 32-92 of the second preferred embodiment. The imaging lens 10 has an overall system focal length of 1.42 mm, an HFOV of 60.0°, an F-number of 2.62, and a system length of 10.63 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are listed in FIG. 34.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9 (a) to 9(d) that the second preferred embodiment is able to achieve a relatively good optical performance.

Figure 10:
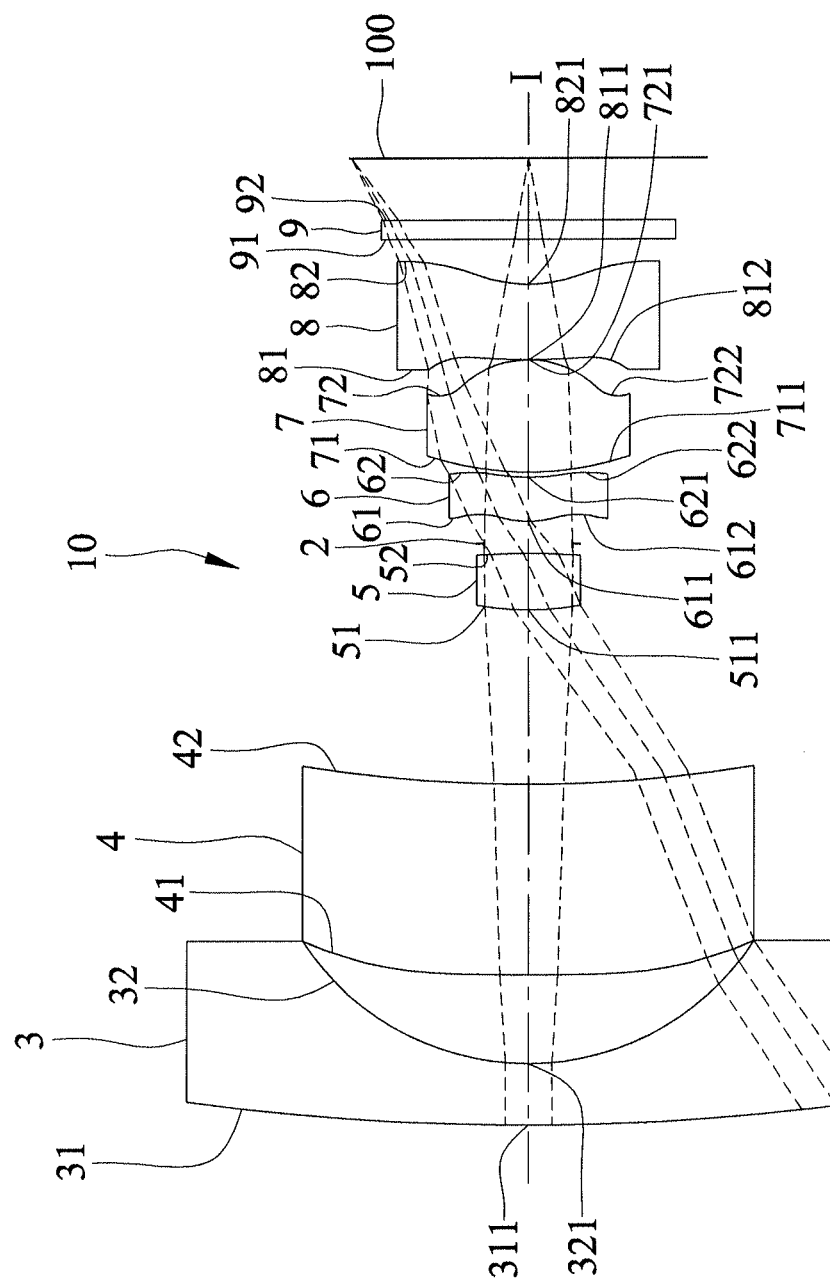
FIG. 10 is a schematic diagram that illustrates the third preferred embodiment of an imaging lens according to the present invention.

Referring to FIG. 10, the differences between the first and third preferred embodiments of the imaging lens 10 of this invention reside in that: the image-side surface 42 of the second lens element 4 is a concave and aspherical surface; and the image-side surface 82 of the sixth lens element 8 is a concave and aspherical surface that has a concave portion 821 in a vicinity of the optical axis (I).

Shown in FIG. 11 is a table that lists values of some optical parameters corresponding to the surfaces 31-91, 32-92 of the third preferred embodiment. The imaging lens 10 has an overall system focal length of 1.45 mm, an HFOV of 60.0°, an F-number of 2.60, and a system length of 10.80 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are listed in FIG. 34.

Figure 13:
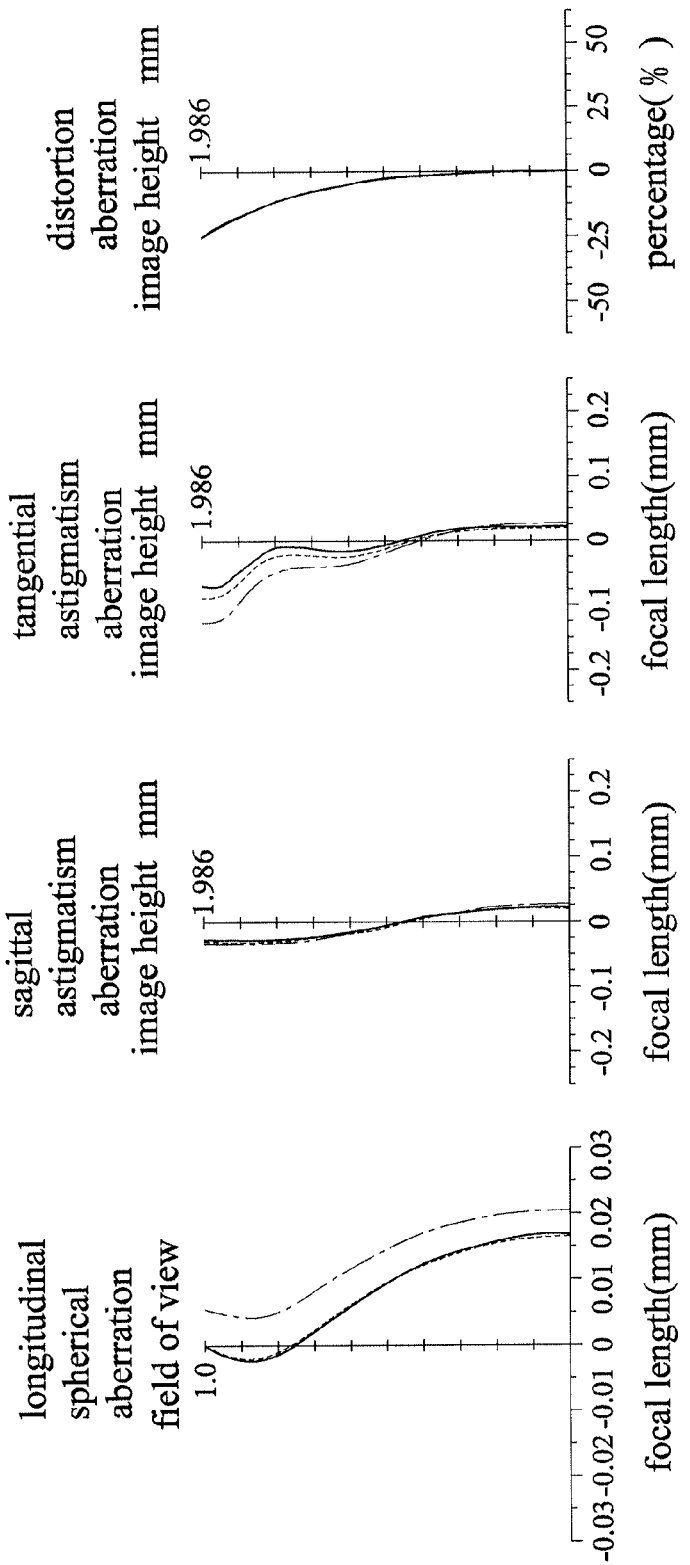
FIGS. 13(a) to 13(d) show different optical characteristics of the imaging lens of the third preferred embodiment.

FIGS. 13 (a) to 13 (d) respectively show simulation results corresponding to longitudinal spherical aberration, sagittal astigmatism aberration, tangential astigmatism aberration, and distortion aberration of the third preferred embodiment. It can be understood from FIGS. 13 (a) to 13 (d) that the third preferred embodiment is able to achieve a relatively good optical performance.

Figure 14:
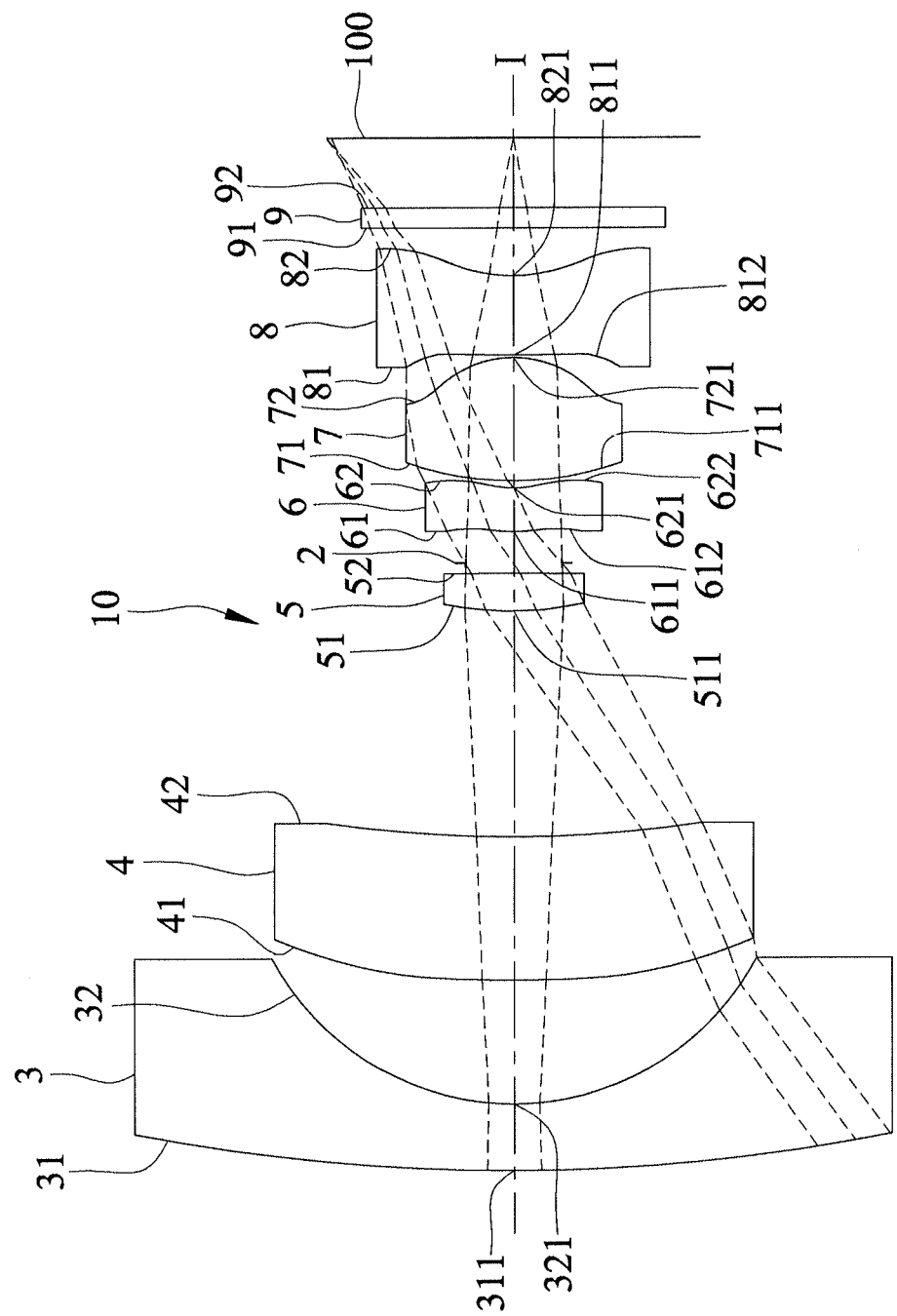
FIG. 14 is a schematic diagram that illustrates the fourth preferred embodiment of an imaging lens according to the present invention.

FIG. 14 illustrates the fourth preferred embodiment of an imaging lens 10 according to the present invention, which has a configuration similar to that of the third preferred embodiment.

Shown in FIG. 15 is a table that lists values of some optical parameters corresponding to the surfaces 31-91, 32-92 of the fourth preferred embodiment. The imaging lens 10 has an overall system focal length of 1.45 mm, an HFOV of 60.0°, an F-number of 2.62, and a system length of 10.77 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are listed in FIG. 34.

Figure 17:
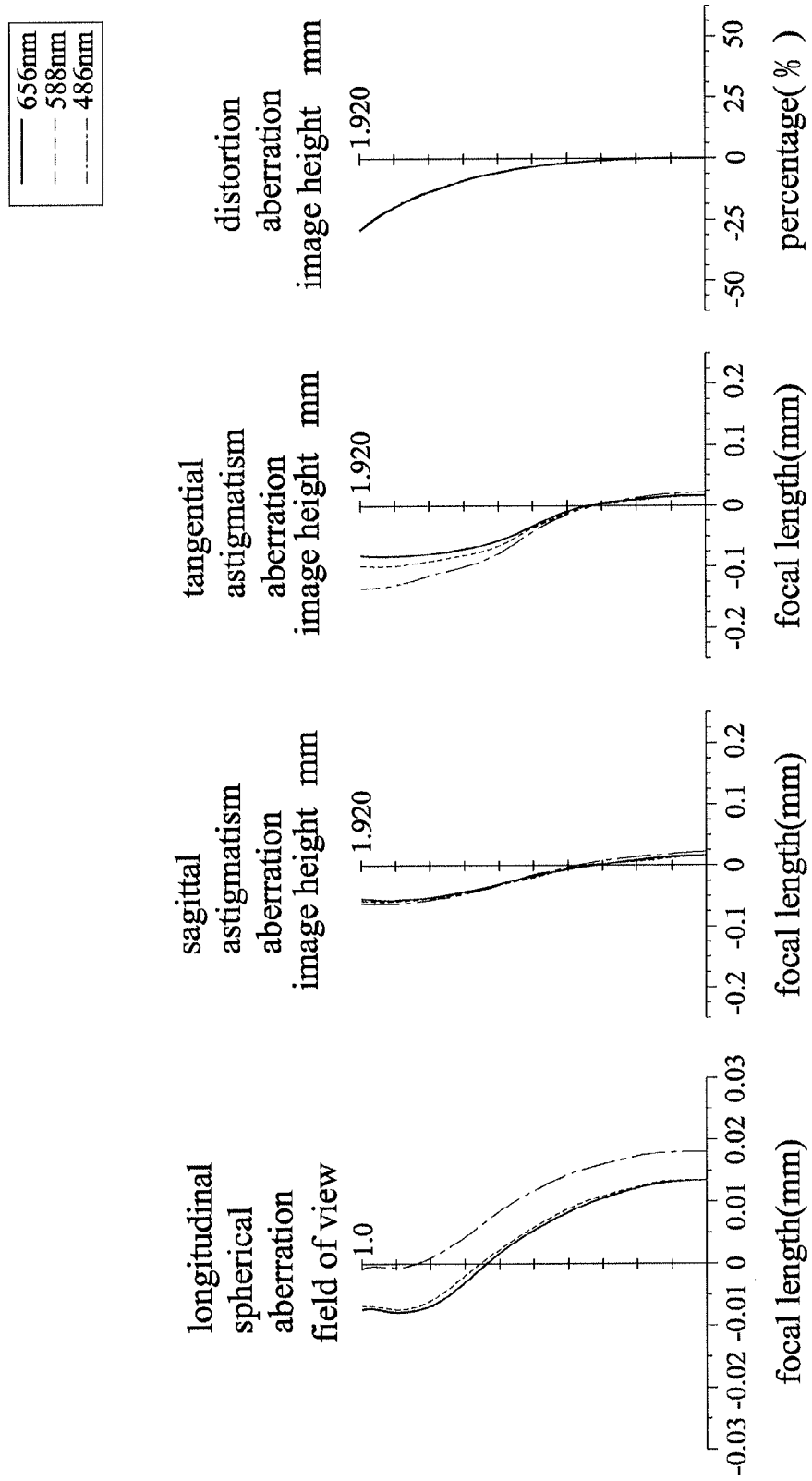
FIGS. 17(a) to 17(d) show different optical characteristics of the imaging lens of the fourth preferred embodiment.

FIGS. 17 (a) to 17 (d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
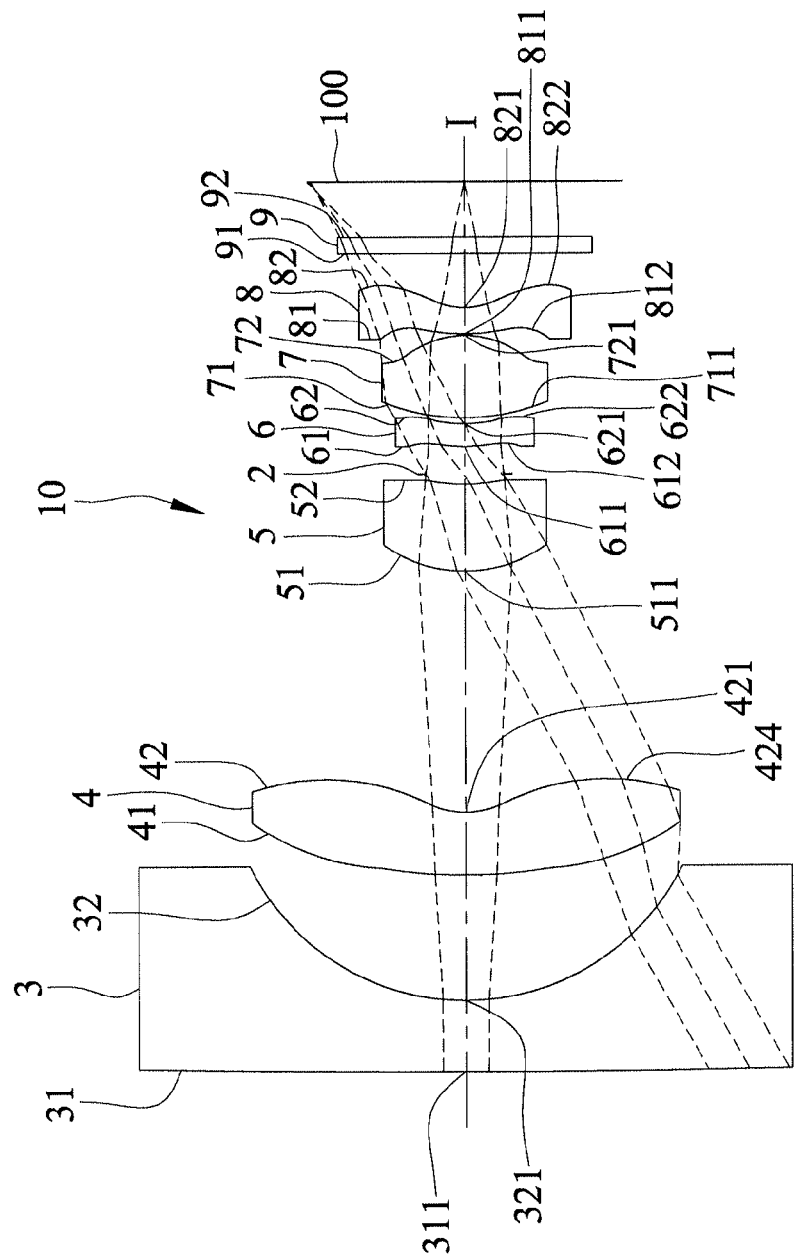
FIG. 18 is a schematic diagram that illustrates the fifth preferred embodiment of an imaging lens according to the present invention.

Referring to FIG. 18, the differences between the first and fifth preferred embodiments of the imaging lens 10 of this invention reside in that: the image-side surface 42 of the second lens element 4 has a concave portion 421 in a vicinity of the optical axis (I), and a convex portion 424 in a vicinity of a periphery of the second lens element 4; and the image-side surface 52 of the third lens element 5 is a concave and aspherical surface.

Shown in FIG. 19 is a table that lists values of some optical parameters corresponding to the surfaces 31-91, 32-92 of the fifth preferred embodiment. The imaging lens 10 has an overall system focal length of 1.46 mm, an HFOV of 60.0°, an F-number of 2.62, and a system length of 10.86 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are listed in FIG. 34.

Figure 21:
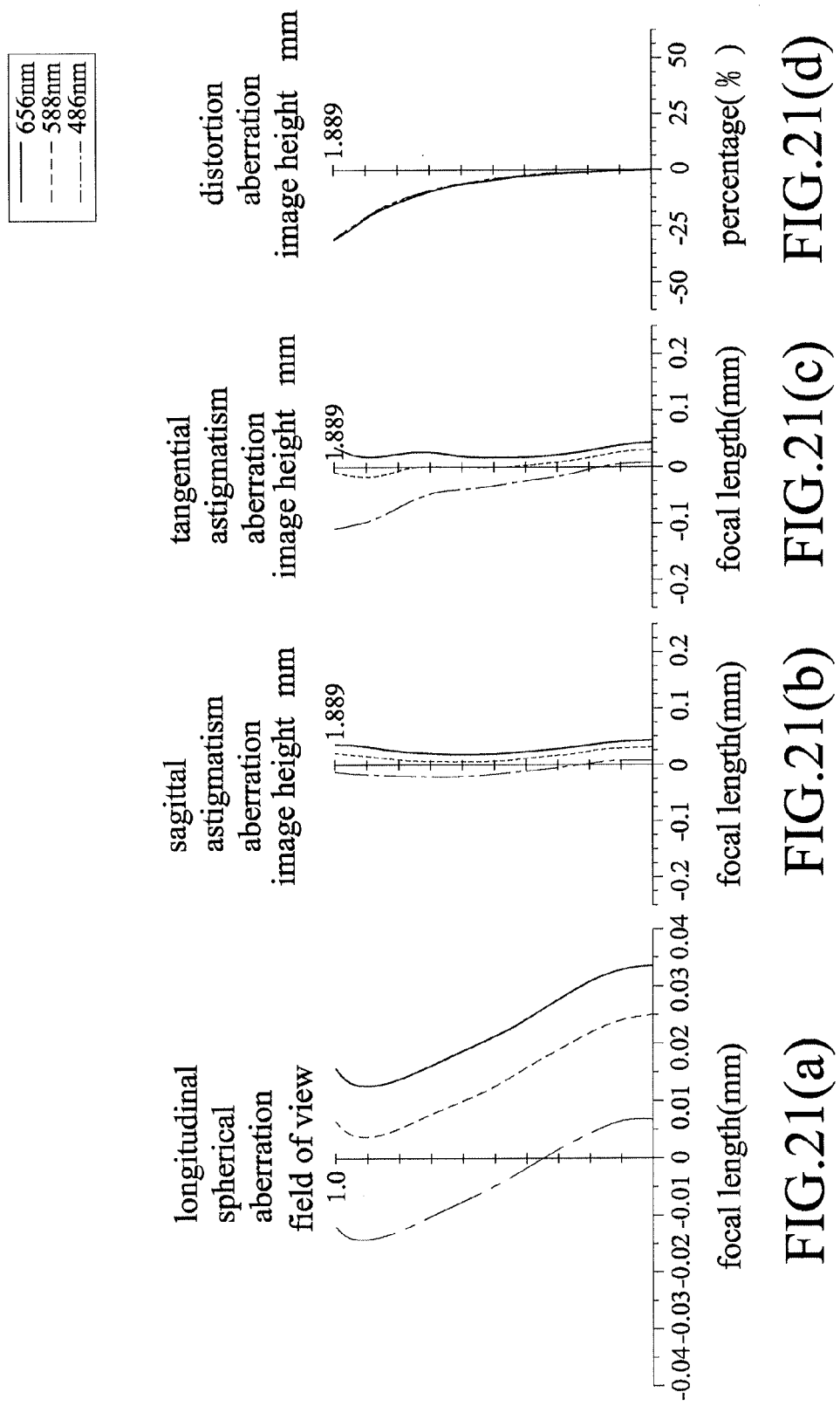
FIGS. 21(a) to 21(d) show different optical characteristics of the imaging lens of the fifth preferred embodiment.

FIGS. 21 (a) to 21 (d) respectively show simulation results corresponding to longitudinal spherical aberration, sagittal astigmatism aberration, tangential astigmatism aberration, and distortion aberration of the fifth preferred embodiment. It can be understood from FIGS. 21(a) 21(d) that the fifth preferred embodiment is able to achieve a relatively good optical performance.

Figure 22:
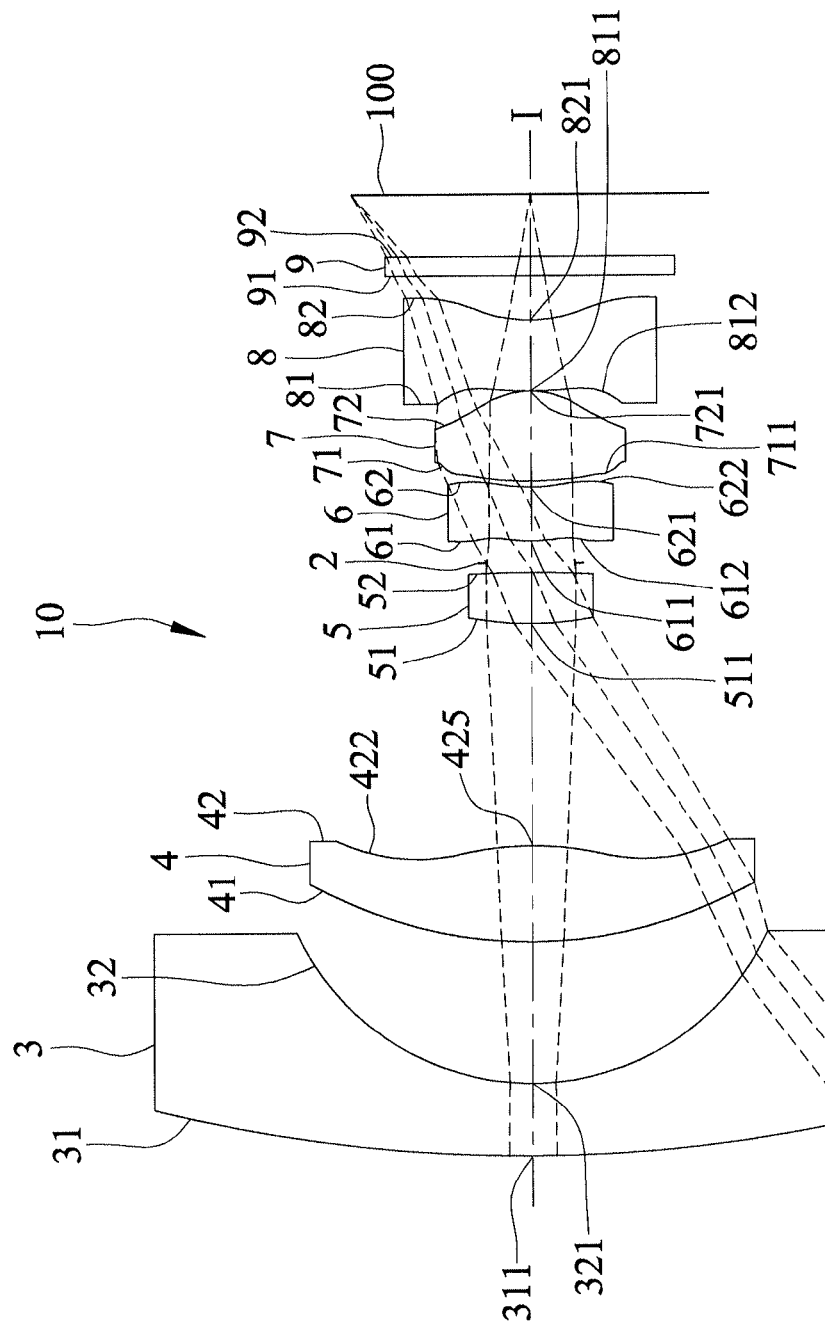
FIG. 22 is a schematic diagram that illustrates the sixth preferred embodiment of an imaging lens according to the present invention.
Figure 25:
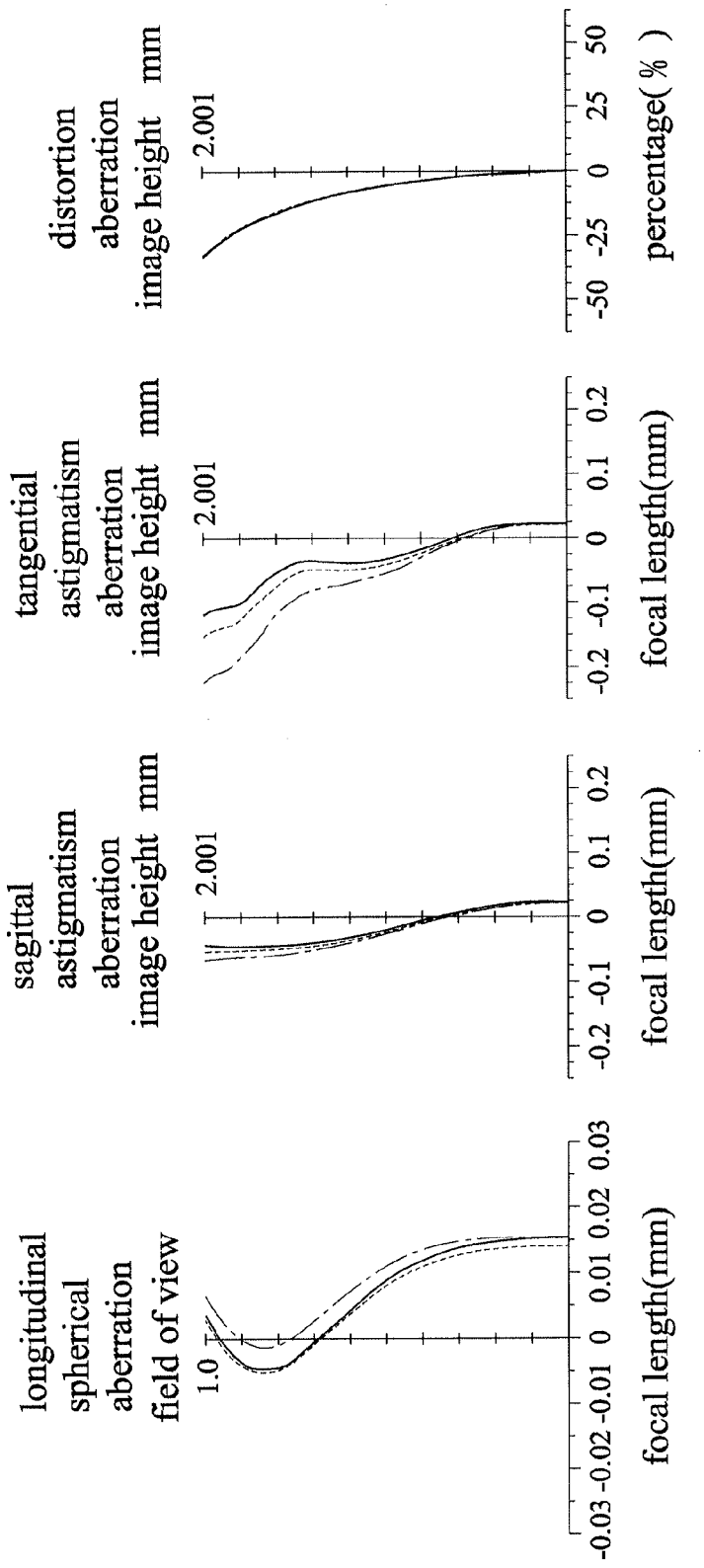
FIGS. 25(a) to 25(d) show different optical characteristics of the imaging lens of the sixth preferred embodiment.

Referring to FIG. 22, the differences between the third and sixth preferred embodiments of the imaging lens 10 of this invention reside in that: the image-side surface 42 of the second lens element 4 has a convex portion 425 in a vicinity of the optical axis (I), and a concave portion 422 in a vicinity of a periphery of the second lens element 4.

Shown in FIG. 23 is a table that lists values of some optical parameters corresponding to the surfaces 31-91, 32-92 of the sixth preferred embodiment. The imaging lens 10 has an overall system focal length of 1.45 mm, an HFOV of 62.0°, an F-number of 2.60, and a system length of 10.81 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are listed in FIG. 34.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25 (a) to 25(d) that the sixth preferred embodiment is able to achieve a relatively good optical performance.

Figure 26:
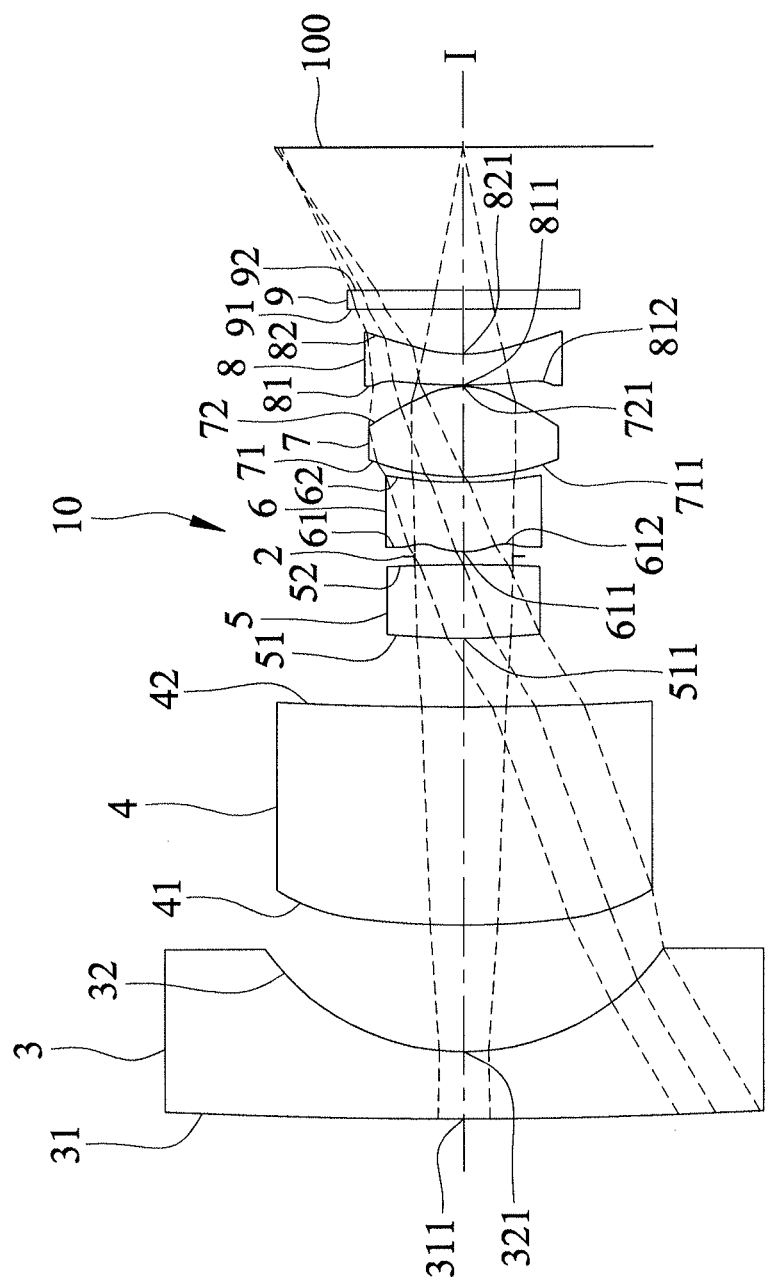
FIG. 26 is a schematic diagram that illustrates the seventh preferred embodiment of an imaging lens according to the present invention.
Figure 29:
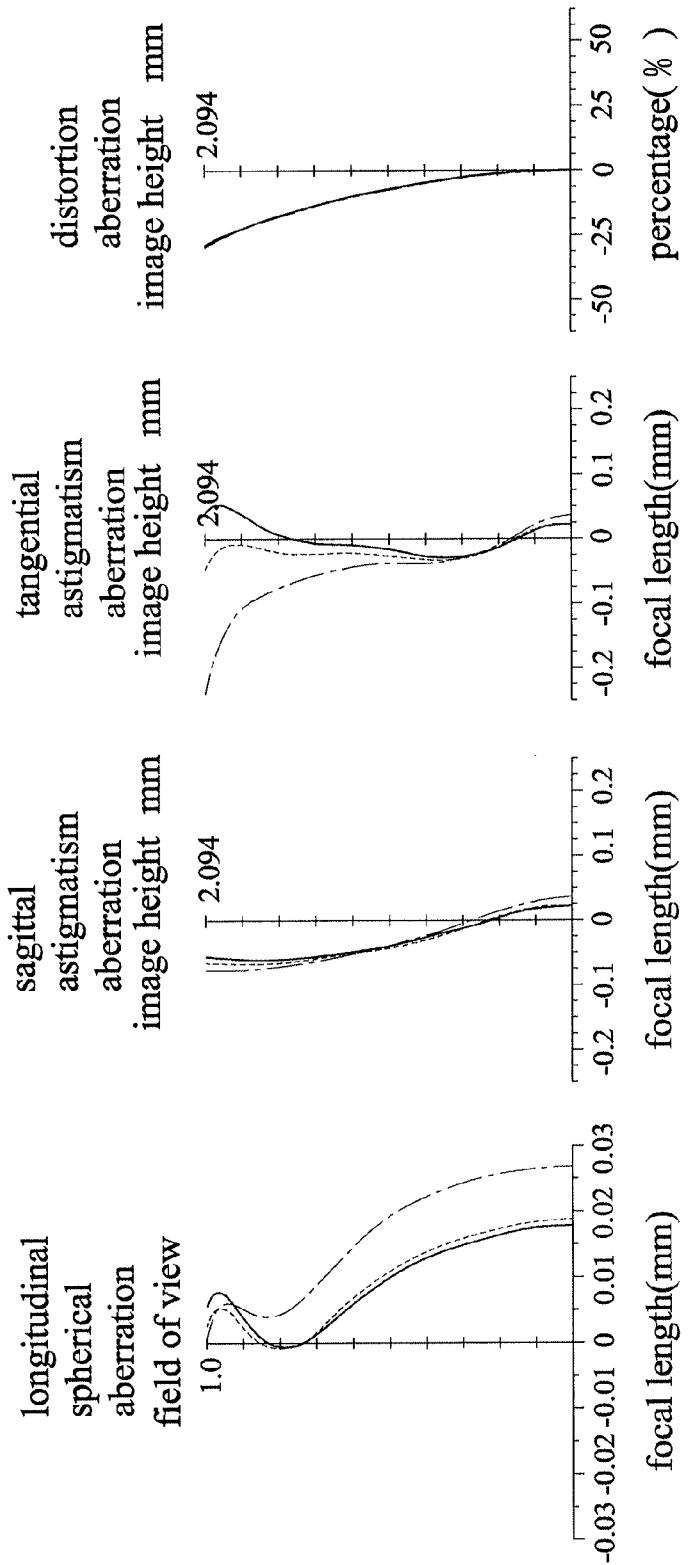
FIGS. 29(a) to 29(d) show different optical characteristics of the imaging lens of the seventh preferred embodiment.

Referring to FIG. 26, the differences between the third and seventh preferred embodiments of the imaging lens 10 of this invention reside in that: the image-side surface 62 of the fourth lens element 6 is a concave and aspherical surface.

Shown in FIG. 27 is a table that lists values of some optical parameters corresponding to the surfaces 31-91, 32-92 of the seventh preferred embodiment. The imaging lens 10 has an overall system focal length of 1.45 mm, an HFOV of 62.0°, an F-number of 2.60, and a system length of 10.78 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are listed in FIG. 34.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Figure 30:
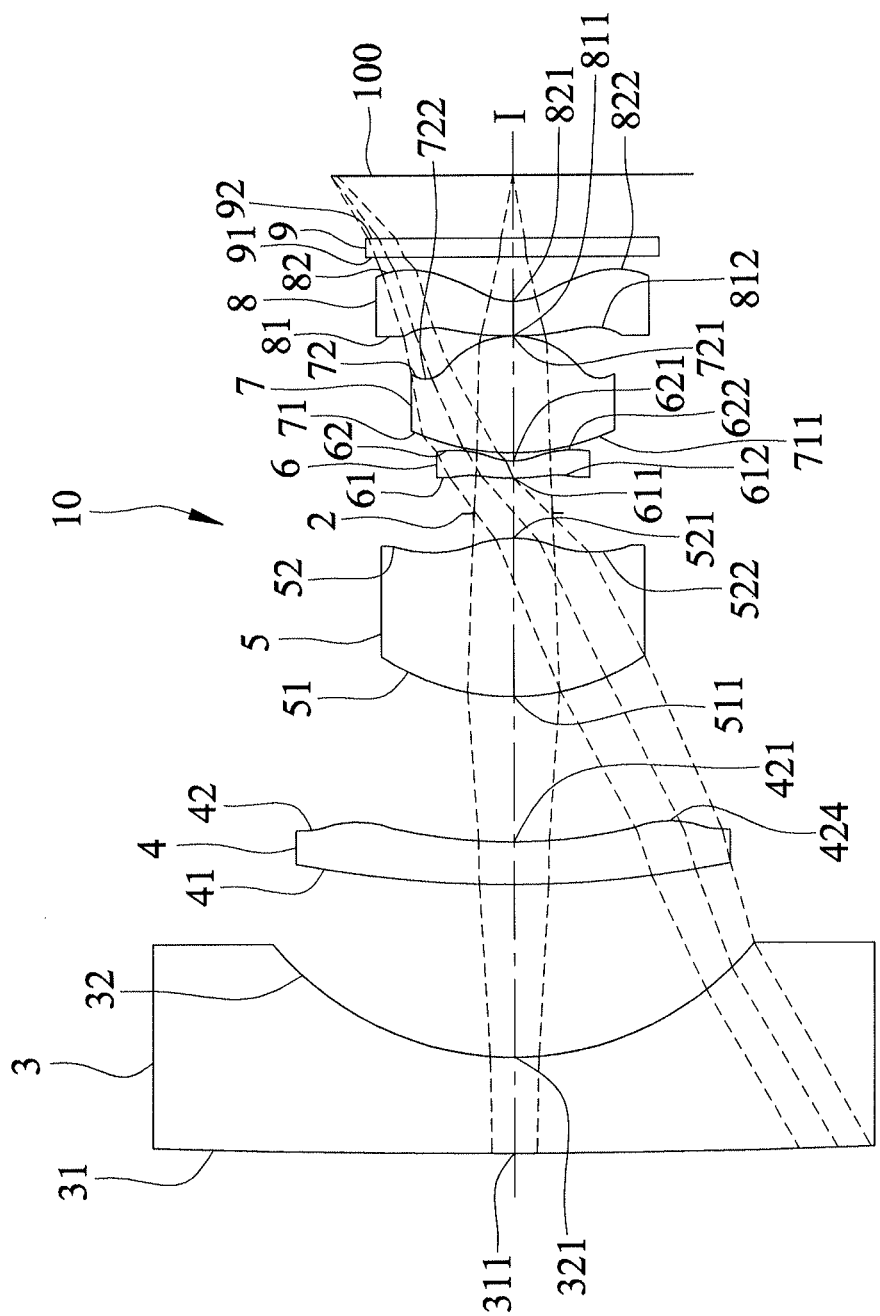
FIG. 30 is a schematic diagram that illustrates the eighth preferred embodiment of an imaging lens according to the present invention.
Figure 33:
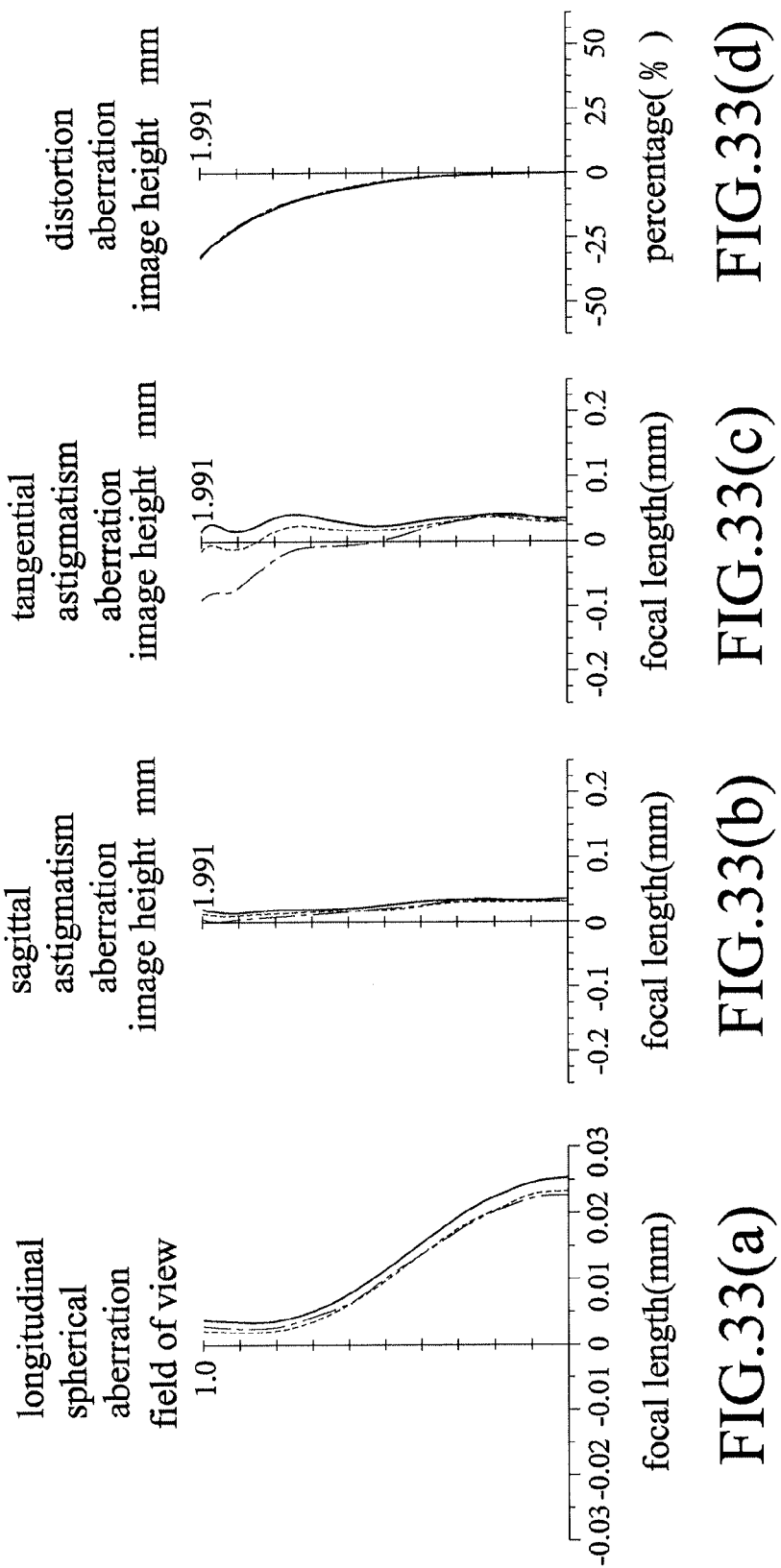
FIGS. 33(a) to 33(d) show different optical characteristics of the imaging lens of the eighth preferred embodiment.

Referring to FIG. 30, the differences between the first and eighth preferred embodiments of the imaging lens 10 of this invention reside in that: the second lens element 4 has a negative refractive power; the image-side surface 42 of the second lens element 4 has a concave portion 421 in a vicinity of the optical axis (I), and a convex portion 424 in a vicinity of a periphery of the second lens element 4; the image-side surface 52 of the third lens element 5 has a convex portion 521 in a vicinity of the optical axis (I), and a concave portion 522 in a vicinity of a periphery of the third lens element 5; and the image-side surface 72 of the fifth lens element 7 has a convex portion 721 in a vicinity of the optical axis (I), and a concave portion 722 in a vicinity of a periphery of the fifth lens element 7.

Shown in FIG. 31 is a table that lists values of some optical parameters corresponding to the surfaces 31-91, 32-92 of the eighth preferred embodiment. The imaging lens 10 has an overall system focal length of 1.43 mm, an HFOV of 62.0°, an F-number of 2.62, and a system length of 10.70 mm.

Shown in FIG. 32 is a table that lists values of some optical parameters of the aforementioned optical relationship (1) corresponding to the eighth preferred embodiment.

Relationships among some of the aforementioned optical parameters corresponding to the eighth preferred embodiment are listed in FIG. 34.

FIGS. 33(a) to 33(d) respectively show simulation results corresponding to longitudinal spherical aberration, sagittal astigmatism aberration, tangential astigmatism aberration, and distortion aberration of the eighth preferred embodiment. It can be understood from FIGS. 33(a) to 33(d) that the eighth preferred embodiment is able to achieve a relatively good optical performance.

Shown in FIG. 34 is a table that lists the aforesaid relationships among some of the aforementioned optical parameters corresponding to the eight preferred embodiments for comparison. When each of the optical parameters of the imaging lens 10 according to this invention satisfies the following optical relationships, the optical performance is still relatively good even with the reduced system length:

(1) ALT/T2≤10.5: In order to reduce an overall system length of the imaging lens 10, ALT should be small. Since the second lens element 4 has a relatively large optical effective diameter, T2 is designed to be thicker for facilitating production, resulting in smaller reducible ratio compared to ALT. Preferably, 2.0≤ALT/T2≤10.5.

(2) Gaa/T6≥3.5: Since the sixth lens element 8 has a relatively small optical effective diameter, T6 may be made thinner, and has a relatively large reducible ratio. Since the second lens element 4 has an optical effective diameter much larger than that of the third lens element 5, light exiting from the second lens element 4 requires a sufficient distance to enter the third lens element 5 within an area defined by the optical effective diameter of the latter. Therefore, G23 has a relatively small reducible ratio. Although other air gap lengths at the optical axis (I) may have a relatively large reducible ratio compared to G23, contribution to reduction of the system length is small, so that Gaa has a small reducible ratio. Better arrangement may be achieved when this relationship is satisfied. Preferably, 3.5≤Gaa/T6≤20.0.

(3) 0.9≤G23/T3≤6.5 and 0.9≤G23/T4≤30.0: As mentioned above, G23 has a relatively small reducible ratio. Since the third and fourth lens elements 5, 6 have a relatively small optical effective diameter, T3 and T4 have a relatively large reducible ratio. Considering optical performance and manufacturing ability, better arrangement may be achieved when G23/T3 ranges between 0.9 and 6.5, and G23/T4 ranges between 0.9 and 30.0. Preferably, G23/T4 ranges between 0.9 and 12.0.

(4) Gaa/T4≥3.0: As mentioned above, Gaa has a relatively small reducible ratio, and T4 has a relatively large reducible ratio. Better arrangement may be achieved when this relationship is satisfied. Preferably, 3.0≤Gaa/T4≤23.0.

(5) Gaa/T3≥2.6: As mentioned above, Gaa has a relatively small reducible ratio, and T3 has a relatively large reducible ratio. Better arrangement may be achieved when this relationship is satisfied. Preferably, 2.6≤Gaa/T3≤11.5.

(6) EFL/G34≥1.6: Since G34 is not limited by surface shapes of adjacent lens elements, G34 has a relatively large reducible ratio. Considering the field-of-view angle and manufacturing ability, the reducible ratio of EFL is limited. Better arrangement may be achieved when this relationship is satisfied. Preferably, 1.6≤EFL/G34≤7.8.

(7) 1.0≤G23/G34: As mentioned above, G23 has a relatively small reducible ratio, and G34 does not have such a limitation and has a relatively large reducible ratio. Better arrangement may be achieved when this relationship is satisfied. Preferably, 1.0≤G23/G34≤7.8.

(8) 1.3≤ALT/G12≤4.2: As mentioned above, ALT should be small, while G12 should have sufficient length to meet requirements of optical performance. Considering manufacturing ability and the system length, reduction of ALT and the length of G12 are limited. Better arrangement may be achieved when ALT/G12 ranges between 1.3 and 4.2.

(9) ALT/G23≤11.5: As mentioned above, ALT should be small, while reduction of G23 is limited. Better arrangement may be achieved when this relationship is satisfied. Preferably, 1.0≤ALT/G23≤11.5.

(10) T6/T2≤1.2: Since the sixth lens element 8 has a relatively small optical effective diameter and the second lens element 4 has a relatively large optical effective diameter, T6 should be designed to be small, and T2 should have a sufficient thickness for facilitating production. Better arrangement may be achieved when this relationship is satisfied. Preferably, 0.05≤T6/12≤1.2.

(11) 2.0≤EFL/T4≤15.0: Considering field-of-view angle and manufacturing ability, reduction of EFL is limited, while T4 may be made thinner as mentioned above. Considering optical performance and manufacturing ability, better arrangement may be achieved when EFL/T4 ranges between 2.0 and 15.0.

(12) G23/T6≥2.15: As mentioned above, G23 has a relatively small reducible ratio, and T6 has a relatively large reducible ratio. Better arrangement may be achieved when this relationship is satisfied. Preferably, 2.15≤G23/T6≤9.3.

(13) ALT/EFL≤5.5: As mentioned above, ALT should be small, while reduction of EFL is limited. Better arrangement may be achieved when this relationship is satisfied. Preferably, 2.0≤ALT/EFL≤5.5.

(14) T5/T4≤1.3: Since the image-side surface 72 of the fifth lens element 7 has the convex portion 721 in the vicinity of the optical axis (I), the reducible ratio of T5 is limited. However, T4 does not have such a limitation, and has a relatively large reducible ratio. Better arrangement may be achieved when this relationship is satisfied. Preferably, 1.3≤T5/T4≤6.7.

To sum up, effects and advantages of the imaging lens 10 according to the present invention are described hereinafter.

1. The convex portion 311 of the object-side surface 31 and the concave portion 321 of the image-side surface 32 of the first lens element 3 enhance converging ability of the imaging lens 10.

2. By virtue of the convex portions 411, 511, 711, 721 and the concave portion 821, optical aberration of images may be corrected. Since the sixth lens element 8 is made of a plastic material, weight and cost of the imaging lens 10 may be reduced.

3. Through the aforesaid eight preferred embodiments, it is known that the system length of this invention may be reduced down to below 13 mm, so as to facilitate developing thinner relevant products with economic benefits.

Figure 35:
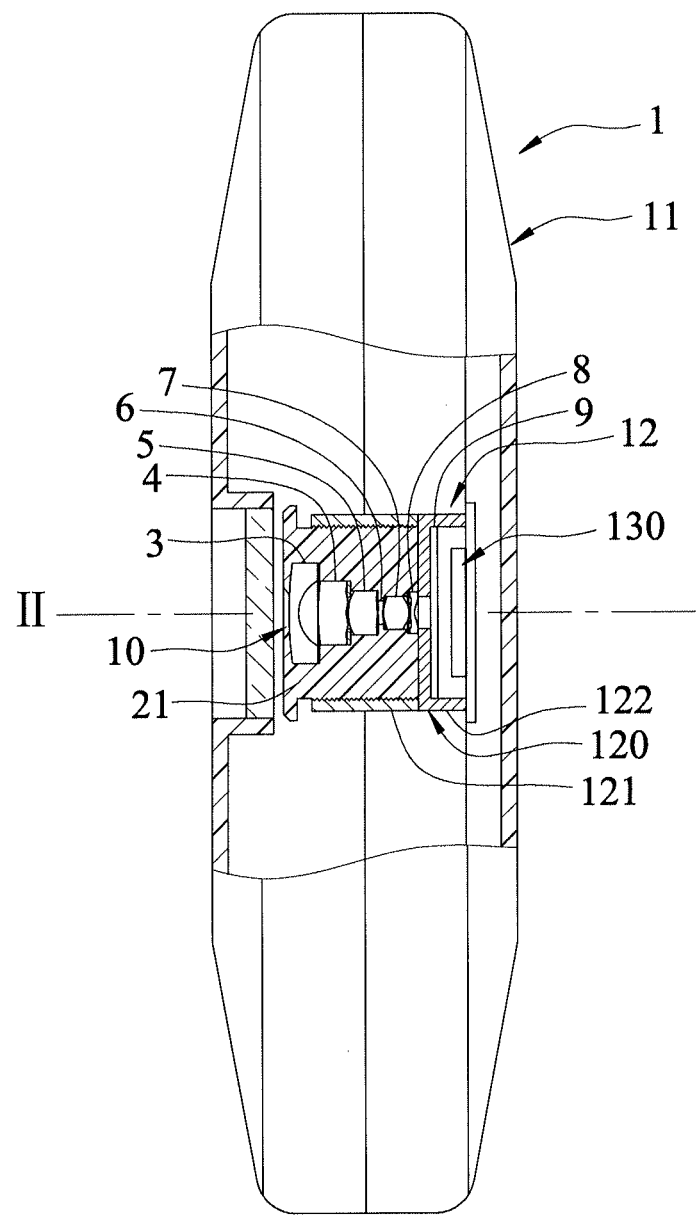
FIG. 35 is a schematic partly sectional view to illustrate a first exemplary application of the imaging lens of the present invention.

Shown in FIG. 35 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 36:
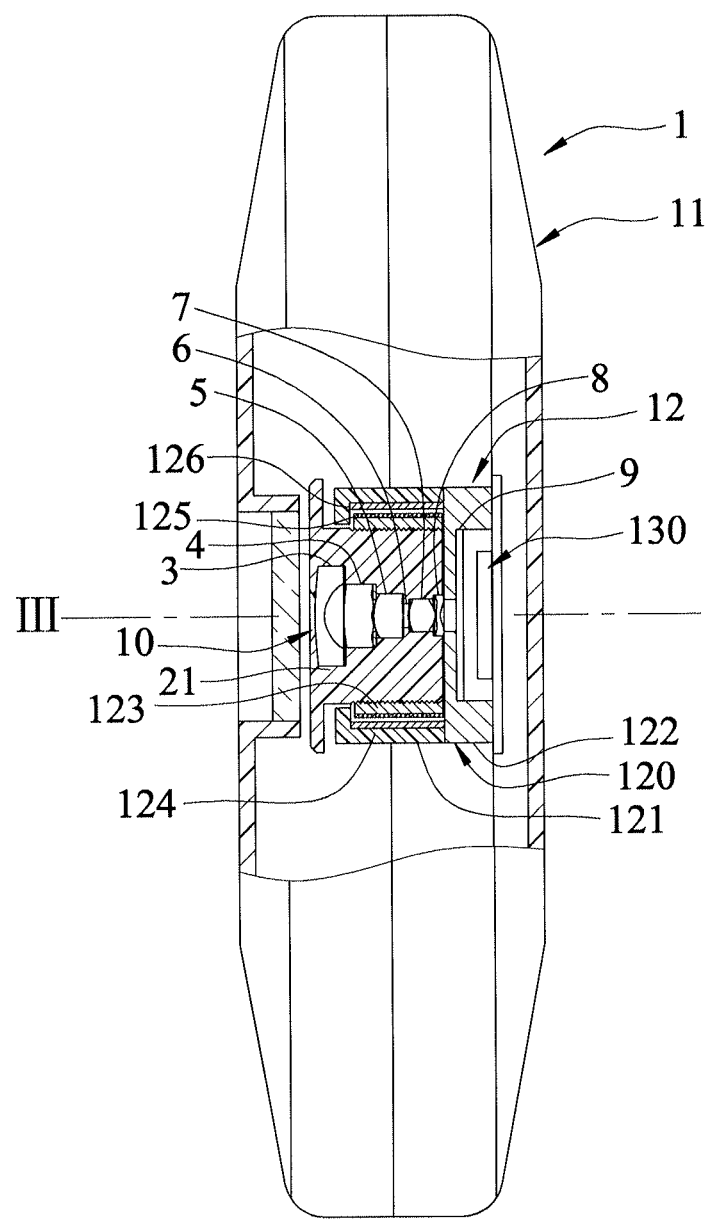
FIG. 36 is a schematic partly sectional view to illustrate a second exemplary application of the imaging lens of the present invention.

Shown in FIG. 36 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element, a fifth lens element, and a sixth lens element arranged in order from an object side to an image side along an optical axis of said imaging lens, each of said first lens element, said second lens element, said third lens element, said fourth lens element, said fifth lens element and said sixth lens element having a refractive power, an object-side surface facing toward the object side, and an image-side surface facing toward the image side, wherein:

said object-side surface of said first lens element has a convex portion in a vicinity of the optical axis, and said image-side surface of said first lens element has a concave portion in a vicinity of the optical axis;

said object-side surface of said second lens element has a convex portion in a vicinity of the optical axis;

said object-side surface of said third lens element has a convex portion in a vicinity of the optical axis;

said object-side surface of said fifth lens element has a convex portion in a vicinity of a periphery of said fifth lens element, and said image-side surface of said fifth lens element has a convex portion in a vicinity of the optical axis;

said image-side surface of said sixth lens element has a concave portion in a vicinity of the optical axis, and said sixth lens element is made of a plastic material;

said imaging lens does not include any lens element with refractive power other than said first lens element, said second lens element, said third lens element, said fourth lens element, said fifth lens element and said sixth lens element; and said imaging lens satisfying $1.0 \leq ALT/G23 \leq 11.5$, where ALT represents a sum of thicknesses of said first lens element, said second lens element, said third lens element, said fourth lens element, said fifth lens element and said sixth lens element at the optical axis; and G23 represents an air gap length between said second lens element and said third lens element at the optical axis.

2. The imaging lens as claimed in claim 1, satisfying $ALT/T2 \leq 10.5$, where T2 represents the thickness of said second lens element at the optical axis.

3. The imaging lens as claimed in claim 2, further satisfying $Gaa/T6 \geq 3.5$, where Gaa represents a sum of air gap lengths between said first lens element and said sixth lens element at the optical axis; and T6 represents the thickness of said sixth lens element at the optical axis.

4. The imaging lens as claimed in claim 3, further satisfying $0.9 \leq G23/T3 \leq 6.5$, where T3 represents the thickness of said third lens element at the optical axis.

5. The imaging lens as claimed in claim 2, further satisfying $Gaa/T4 \geq 3.0$, where Gaa represents a sum of air gap lengths between said first lens element and said sixth lens element at the optical axis; and T4 represents the thickness of said fourth lens element at the optical axis.

6. The imaging lens as claimed in claim 2, further satisfying $0.9 \leq G23/T4 \leq 30.0$, where T4 represents the thickness of said fourth lens element at the optical axis.

7. The imaging lens as claimed in claim 6, further satisfying $Gaa/T3 \geq 2.6$, where Gaa represents a sum of air gap lengths between said first lens element and said sixth lens element at the optical axis; and T3 represents the thickness of said third lens element at the optical axis.

8. The imaging lens as claimed in claim 1, satisfying $EFL/G34 \geq 1.6$, where EFL represents an effective focal length of said imaging lens; and G34 represents an air gap length between said third lens element and said fourth lens element at the optical axis.

9. The imaging lens as claimed in claim 8, further satisfying $G23/G34 \geq 1.0$.

10. The imaging lens as claimed in claim 9, further satisfying $1.3 \leq ALT/G12 \leq 4.2$, where G12 represents an air gap length between said first lens element and said second lens element at the optical axis.

11. The imaging lens as claimed in claim 8, further satisfying T6/T2≤1.2, where T2 represents the thickness of said second lens element at the optical axis; and T6 represents the thickness of said sixth lens element at the optical axis.

12. The imaging lens as claimed in claim 8, further satisfying 2.0≤EFL/T4≤15.0, where T4 represents the thickness of said fourth lens element at the optical axis.

13. The imaging lens as claimed in claim 12, further satisfying G23/T6≤2.15, where T6 represents the thickness of said sixth lens element at the optical axis.

14. The imaging lens as claimed in claim 1, satisfying ALT/EFL≤5.5, where EFL represents an effective focal length of said imaging lens.

15. The imaging lens as claimed in claim 14, further satisfying T5/T4≤1.3, where T4 represents the thickness of said fourth lens element at the optical axis; and T5 represents the thickness of said fifth lens element at the optical axis.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *